(12) United States Patent
Kung et al.

(10) Patent No.: US 7,289,489 B1
(45) Date of Patent: *Oct. 30, 2007

(54) METHOD FOR BILLING IP BROADBAND SUBSCRIBERS

(75) Inventors: Fen-Chung Kung, Bridgewater, NJ (US); Anish Sankalia, Iselin, NJ (US); Hopeton Walker, Haledon, NJ (US); Spencer Wang, Parsippany, NJ (US)

(73) Assignee: AT&T Corp., New York, NY (US)

( * ) Notice: Subject to any disclaimer, the term of this patent is extended or adjusted under 35 U.S.C. 154(b) by 318 days.

This patent is subject to a terminal disclaimer.

(21) Appl. No.: 10/840,007

(22) Filed: May 5, 2004

Related U.S. Application Data

(63) Continuation of application No. 09/475,797, filed on Dec. 30, 1999, now Pat. No. 6,775,267.

(51) Int. Cl.
*H04L 12/66* (2006.01)
(52) U.S. Cl. ............... 370/352; 370/395.21; 370/401; 379/114.01
(58) Field of Classification Search ................ None
See application file for complete search history.

(56) References Cited

U.S. PATENT DOCUMENTS 4,694,487 A    9/1987  Chang et al.

(Continued)

FOREIGN PATENT DOCUMENTS

EP    0 841 831 A2    5/1998

(Continued)

OTHER PUBLICATIONS

Rupp et al, INDEX: A Platform for Determining how People Value the Quality of their Internet Access, IEEE, pp. 85-90, May 1998.*

(Continued)

*Primary Examiner*—Frank Duong

(57) ABSTRACT

A method of billing a variable bit rate communication between a first terminal and a distant terminal to a broadband subscriber permits changing billing parameters during a call in real time in response to user inputs including user requested changes in quality of service, changes in data rate and changes in preferred service provider. A variable bit rate communication to be billed has a variable quality of service related to the degree of utilization of a plurality of different networks. The billing method comprises the steps of i.) receiving user identification data at a first terminal and data representing a required bit rate and a default quality of service selected by the user, ii.) verifying the user identification data to be associated with the broadband service subscriber, iii.) determining least cost alternative network resources available for achieving the communication at the user selected default quality of service and the required bit rate, iv.) determining cost data associated with the network resources, v.) outputting to the user a least cost for the communication according to their selected default quality of service and alternative least cost network resources, vi.) coupling the first terminal and the distant terminal via the least cost determined network resources at the default quality of service and the required bit rate responsive to user authorization and vii.) billing for the communication at the default quality of service and according to the required bit rate after the termination of the communication.

16 Claims, 11 Drawing Sheets

U.S. PATENT DOCUMENTS

| | | | |
|---|---|---|---|
| 4,887,152 A | 12/1989 | Matsuzaki et al. | |
| 4,926,462 A | 5/1990 | Ladd et al. | |
| 5,099,509 A | 3/1992 | Morganstein et al. | |
| 5,187,710 A * | 2/1993 | Chau et al. | 370/524 |
| 5,260,778 A | 11/1993 | Kauffman et al. | |
| 5,268,958 A | 12/1993 | Nakano | |
| 5,278,894 A | 1/1994 | Shaw | |
| 5,400,327 A | 3/1995 | Dezonno | |
| 5,440,616 A | 8/1995 | Harrington et al. | |
| 5,471,523 A | 11/1995 | Smith et al. | |
| 5,533,100 A | 7/1996 | Bass et al. | |
| 5,533,111 A | 7/1996 | Schlanger | |
| 5,583,929 A | 12/1996 | Ardon | |
| 5,590,184 A | 12/1996 | London | |
| 5,600,643 A | 2/1997 | Robrock, II | |
| 5,615,257 A | 3/1997 | Pezzullo et al. | |
| 5,657,426 A | 8/1997 | Waters et al. | |
| 5,689,708 A | 11/1997 | Regnier et al. | |
| 5,719,872 A | 2/1998 | Dubberly et al. | |
| 5,745,553 A | 4/1998 | Mirville et al. | |
| 5,745,559 A | 4/1998 | Weir | |
| 5,745,569 A | 4/1998 | Moskowitz et al. | |
| 5,809,126 A | 9/1998 | Smith et al. | |
| 5,809,520 A | 9/1998 | Edwards et al. | |
| 5,814,798 A | 9/1998 | Zancho | |
| 5,822,415 A | 10/1998 | Gordon | |
| 5,841,839 A | 11/1998 | Fogg et al. | |
| 5,862,134 A | 1/1999 | Deng | |
| 5,864,612 A | 1/1999 | Strauss et al. | |
| 5,889,844 A | 3/1999 | Kim et al. | |
| 5,905,776 A | 5/1999 | Shaffer | |
| 5,933,490 A | 8/1999 | White et al. | |
| 5,937,347 A | 8/1999 | Gordon | |
| 5,940,598 A | 8/1999 | Strauss et al. | |
| 5,943,397 A | 8/1999 | Gabin et al. | |
| 5,974,142 A | 10/1999 | Heer et al. | |
| 5,982,774 A | 11/1999 | Foladare et al. | |
| 6,005,602 A | 12/1999 | Matthews, III | |
| 6,005,845 A | 12/1999 | Svennesson et al. | |
| 6,014,379 A | 1/2000 | White et al. | |
| 6,044,349 A | 3/2000 | Tolopka et al. | |
| 6,078,582 A | 6/2000 | Curry et al. | |
| 6,094,431 A | 7/2000 | Yamato et al. | |
| 6,148,193 A | 11/2000 | Miska et al. | |
| 6,154,465 A | 11/2000 | Pickett | |
| 6,157,708 A | 12/2000 | Gordon | |
| 6,169,795 B1 | 1/2001 | Dunn et al. | |
| 6,188,760 B1 | 2/2001 | Oran et al. | |
| 6,215,585 B1 | 4/2001 | Yoshimura et al. | |
| 6,219,045 B1 | 4/2001 | Leahy et al. | |
| 6,233,318 B1 | 5/2001 | Picard et al. | |
| 6,236,653 B1 | 5/2001 | Dalton et al. | |
| 6,253,249 B1 | 6/2001 | Belzile | |
| 6,259,449 B1 | 7/2001 | Saxena et al. | |
| 6,308,221 B1 | 10/2001 | Perlman et al. | |
| 6,330,244 B1 | 12/2001 | Swartz et al. | |
| 6,345,047 B1 | 2/2002 | Regnier | |
| 6,374,296 B1 | 4/2002 | Lim et al. | |
| 6,385,305 B1 | 5/2002 | Gersztberg et al. | |
| 6,396,531 B1 | 5/2002 | Gerszberg et al. | |
| 6,397,080 B1 | 5/2002 | Viktorsson et al. | |
| 6,404,764 B1 | 6/2002 | Jones et al. | |
| 6,418,216 B1 | 7/2002 | Harrison et al. | |
| 6,426,955 B1 | 7/2002 | Gossett et al. | |
| 6,430,276 B1 | 8/2002 | Bouvier et al. | |
| 6,445,922 B1 | 9/2002 | Hiller et al. | |
| 6,452,915 B1 | 9/2002 | Jorgensen | |
| 6,456,621 B1 | 9/2002 | Wada et al. | |
| 6,459,783 B1 | 10/2002 | March et al. | |
| 6,463,146 B1 | 10/2002 | Hartley et al. | |
| 6,466,570 B1 | 10/2002 | Low et al. | |
| 6,466,964 B1 | 10/2002 | Leung et al. | |
| 6,473,858 B1 | 10/2002 | Shimomura et al. | |
| 6,522,880 B1 | 2/2003 | Verma et al. | |
| 6,526,508 B2 | 2/2003 | Akins, III et al. | |
| 6,543,051 B1 | 4/2003 | Manson et al. | |
| 6,546,238 B1 | 4/2003 | Nightingale et al. | |
| 6,546,488 B2 | 4/2003 | Dillon et al. | |
| 6,560,203 B1 | 5/2003 | Beser et al. | |
| 6,560,216 B1 | 5/2003 | McNiff et al. | |
| 6,563,793 B1 | 5/2003 | Golden et al. | |
| 6,563,915 B1 | 5/2003 | Salimando | |
| 6,570,870 B1 | 5/2003 | Berstis | |
| 6,577,644 B1 | 6/2003 | Chuah et al. | |
| 6,594,254 B1 | 7/2003 | Kelly | |
| 6,606,744 B1 | 8/2003 | Mikurak | |
| 6,611,531 B1 | 8/2003 | Chen et al. | |
| 6,633,635 B2 | 10/2003 | Kung et al. | |
| 6,651,105 B1 | 11/2003 | Bhagwat et al. | |
| 6,654,607 B1 | 11/2003 | Shobatake et al. | |
| 6,690,663 B1 | 2/2004 | Culver | |
| 6,736,017 B2 | 5/2004 | Mansky | |
| 2003/0095542 A1 | 5/2003 | Chang et al. | |

FOREIGN PATENT DOCUMENTS

| | | |
|---|---|---|
| EP | 0 845 894 A2 | 6/1998 |
| EP | 0 848 560 A2 | 6/1998 |
| EP | 0 921 659 A1 | 6/1999 |
| WO | WO 98/11704 | 3/1998 |
| WO | WO 98/18269 | 4/1998 |

OTHER PUBLICATIONS

Altmann et al, INDEX Project: User Support for buying QoS with regard to user's preferences, IEEE, pp. 101-104, 1998.*

Edell et al, Providing Internet Access: What we learn from the INDEX Trial, downloadable from Berkley University, pp. 1-17, Apr. 1999.*

W. Doeringer, et al., Access architecture for a multiprotocol broadband backbone, Computer Networks and ISDN Systems 29 (1997), pp. 137-155, Elsevier Science B.V.

Japanese Patent Abstract Publication No. 10-032643, published Feb. 3, 1998.

Japanese Patent Laid Open Publication No. Hei 6-334680, published Dec. 2, 1994.

Japanese Patent Laid Open Publication No. Hei 10-70566, published Mar. 16, 1989.

Japanese Patent Laid Open Publication No. Hei 11-225169, published Aug. 17, 1999.

* cited by examiner

200

| CALLED PARTY DATA | | | | | | | | | |
|---|---|---|---|---|---|---|---|---|---|
| LOCATION | | | TERMINAL RESOURCES | | | | | NETWORK RESOURCES | |
| CITY | STATE | COUNTRY | DATA | VOICE | DIGITAL AUDIO | VIDEO | HDTV | IP | WIRELESS | LOCAL CXR |

DN: DIALING NUMBER
TN: TELEPHONE NUMBER
NP: NETWORK PROVIDER
ONP(ID): ORIGINATING NETWORK PROVIDER IDENTIFIER
NNP(ID): NEXT NETWORK PROVIDER IDENTIFIER
DNP(ID): DESTINATION NETWORK PROVIDER IDENTIFIER

METHOD FOR BILLING IP BROADBAND SUBSCRIBERS

CROSS-REFERENCE TO RELATED APPLICATION

This is a continuation of U.S. patent application Ser. No. 09/475,797 filed Dec. 30, 1999 now U.S. Pat. No. 6,775,267.

FIELD OF THE INVENTION

The present invention relates to methods for billing for Internet broadband communications between or among users, and more particularly, to providing multi-network access and least cost routing among a broadband Internet Protocol Telephony Network (IPTN) and a public switched telephone network among other network alternatives.

BACKGROUND OF THE INVENTION

Present day telephony voice networks have a network built around circuit switches, end offices, a toll network, tandem switches, and twisted pair wires (where the twisted pair wire couples the end office and customer premises equipment. These voice networks are referred to as a public switched telephone network (PSTN) and their services referred to as plain old telephone service (POTS). Due to bandwidth limitations of plain old telephone service (POTS), there is an inherent inability to efficiently integrate multiple types of media such as telephony, data communication for personal computers (PC), and television (TV) broadcasts. Accordingly, a new broadband architecture is required. This new architecture gives rise to a new array of user services.

Presently, least cost routing services may be provided for POTS services by locating a least cost route for a given circuit switched call between a caller and a called party, especially in a business setting have both private line and switched circuit connection opportunities. For example, private branch exchange systems automatically select a least cost route for a typical voiceband call. A leased private line, for example, a T1 carrier link comprising twenty-four separate channels may be utilized in preference to reliance upon the public switched network to take full advantage of the leased facilities. On the other hand, in an Internet Protocol Telephony Network (IPTN), voice telephony services are offered at no cost to the user but quality of service in comparison to PSTN calls suffers. A decrease in quality of service may be experienced by the caller or called party due to high traffic conditions or limitations in connecting facilities as increased delay or voice quality due to lost packets. Lost packets generally appears to the user as a degradation in signal-to-noise ratio. On the other hand, the Internet promises multimedia communication opportunities including but not limited to video teleconferencing, high resolution imagery transmission and high fidelity digital sound.

Notwithstanding the promise of the Internet, the tendency to date in existent voice over IP (VoIP) telecommunication billing systems is to emulate existent telephony billing arrangements. For example, International Publication No. WO 98/19448 published 7 May, 1998, by Ericsson of Sweden discloses a method of billing an Internet call in a conventional manner by doing an IP address assignment at a POP and by accompanying an A-number (calling party number) with a personal password or PIN that are collected at call placement. The call is billed according to the called telephone number, their location in reference to the calling party and the duration of the call.

Consequently, there exists a great opportunity to provide new methods and procedures for billing IP broadband subscribers for such multi-media communications and to further provide least cost routing as a function of quality of service in the new millennium.

SUMMARY OF THE INVENTION

Aspects of the invention include providing broadband access capabilities or enhanced services for use in conjunction with a packetized network such as an Internet Protocol (IP) based system infrastructure.

Other aspects of the invention include providing one or more of the following either individually, or in any combination or subcombination:

a new broadband architecture;

broadband network capabilities, including local access;

enhanced multi-media services for use in conjunction with a packetized network such as an Internet Protocol (IP) based system infrastructure;

utilizing a SIM card to validate a user associated with a subscriber or off-premises location;

providing users with choices of networks including the PSTN, an IPTN, a wireless or other available networks, locally displaying or providing alternative network selection means for any such choices to a user and actuating such changes as a function of quality of service; and providing real-time selection and billing choices to the subscriber as a function of network path selection and quality of service including providing a network path display of alternative network paths in priority order by quality of service or by cost of connection.

According to the present invention, a method of billing a variable bit rate communication between a first terminal and a distant terminal to a broadband subscriber at the first terminal, the variable bit rate communication having a variable quality of service related to the degree of utilization of a plurality of different networks, comprises the steps of: i.) receiving user identification data at the first terminal and data representing a required bit rate and a default quality of service selected by the user, ii.) verifying the user identification data to be associated with a broadband subscriber, iii.) determining least cost alternative network resources available for achieving the communication at the default quality of service and the required bit rate, iv.) determining cost data associated with the network resources, v.) outputting to the user a least cost for the communication according to the default quality of service and the least cost alternative network resources, vi.) coupling the first terminal and the distant terminal via the least cost determined network resources and the default quality of service at the required bit rate responsive to user authorization and vii.) billing for the communication at the default quality of service and according to the required bit rate after the termination of the communication.

Although the invention has been defined using the appended claims, these claims are exemplary and limiting to the extent that the invention is meant to include one or more elements from the apparatus and methods described herein and in the applications incorporated by reference in any combination or subcombination. Accordingly, there is any number of alternative combinations for defining the invention, which incorporate one or more elements from the

BRIEF DESCRIPTION OF THE DRAWINGS

FIG. 7 is a collection of screen portions which may comprise screens displayed on displays to users of the present invention such as call set up screens, call progress screens and alternative call routing screens.

FIG. 9 is a collection of screen portions which may comprise screens for call progress data display and data entry.

DETAILED DESCRIPTION OF PREFERRED EMBODIMENTS

A new system is provided for broadband multimedia access and billing applications providing a least cost routing for a communication in accordance with the user's selection of data rate and quality of service, among other user selections. Unless otherwise indicated by the appended claims, the present invention is not limited to the preferred embodiments described in this section but is applicable to other integrated multimedia communication systems.

I. Integrated Communication System Overview

Figure 1:
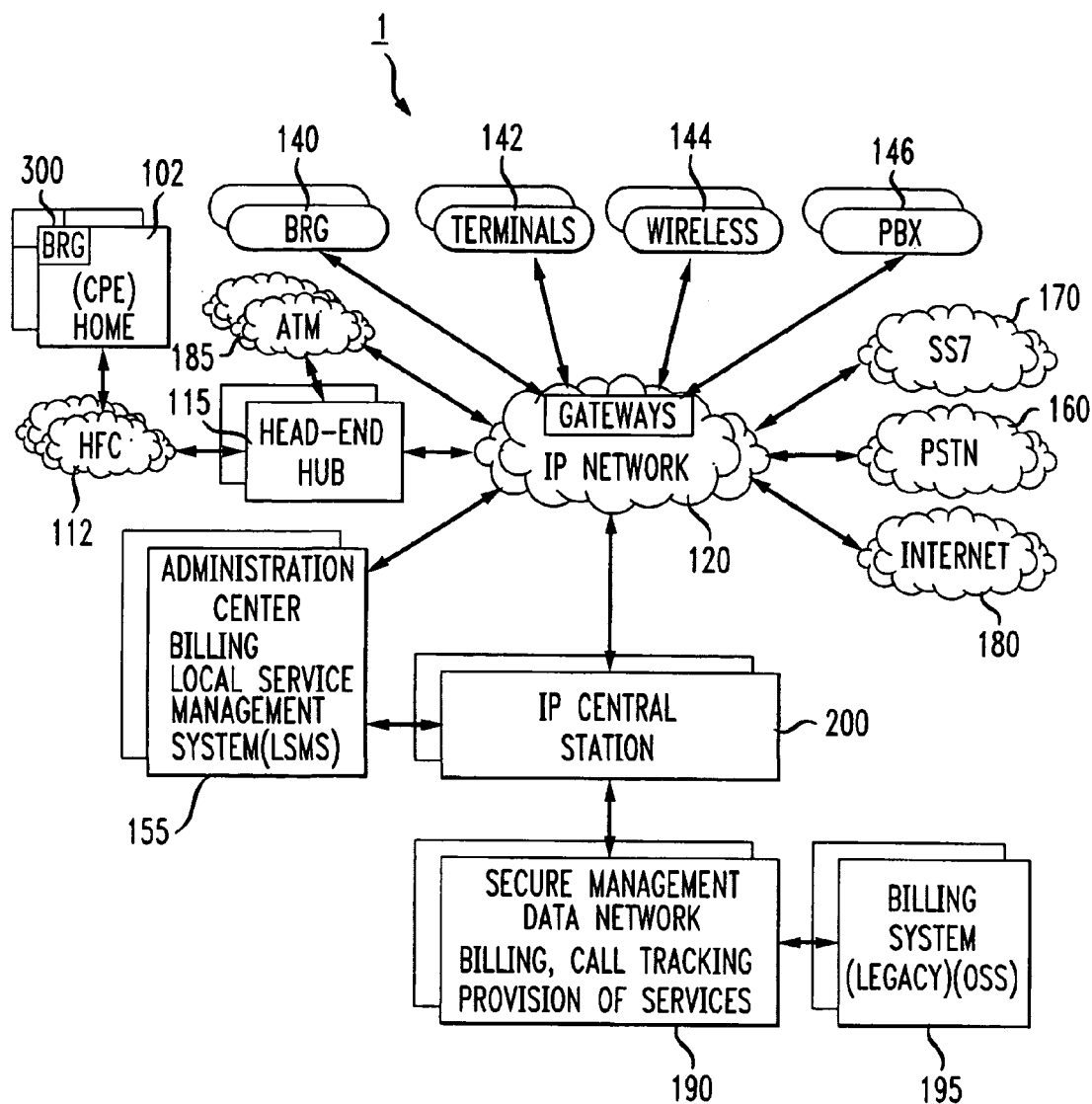
FIG. 1 shows a schematic representation of a broadband network (for example, broadband IP based network) in accordance with a preferred embodiment of aspects of the present invention.

Referring to FIG. 1, an exemplary embodiment of a broadband network 1. The broadband network generally provides interconnection between a plurality of customer locations utilizing various interconnection architectures including an Internet Protocol (IP) based network, various existing systems (legacy systems) such as the public switched telephone network (PSTN), ATM networks, the Internet, signaling networks, as well as other systems. The broadband network provides versatile intelligent conduits that may carry, for example, Internet Protocol (IP) telephony or multimedia signals between the customer premises over, for example, the public switched telephone network, Internet, or wireless communication networks. All networks shown in FIG. 1 may be generally categorized as either circuit-switched networks or packet-switched or packet-based networks. Circuit-switched networks generally involve the creation of an end-to-end facility that is dedicated to a given communication for its duration while packet-switched networks share common facilities; (a data packet is addressed and can follow a plurality of paths to an addressed far end terminal).

Again referring to FIG. 1, the broadband network 1 may include one or more customer premises equipment (CPE) units 102. The customer premise equipment 102 may be variously configured. In one example, the customer premise equipment 102 may include one or more local control devices such as a broadband residential gateway (BRG) 300. Although the broadband residential gateway is preferably disposed in a residence for many aspects of the invention, in exemplary embodiments, it may also be disposed in a business, government or other location. The broadband residential gateway 300 may be variously configured to provide one or more integrated communication interfaces to other devices within the customer premise equipment 102 such as televisions (TV), personal computers (PC), plain old telephone system (POTS) phone(s), video phones, IP enabled phones, and other devices. For example, the broadband residential gateway 300 may provide one or more telephone port connections (for example, plain old telephone system), Ethernet connections, coaxial connections, fiber distributed data interface (FDDI) connections, wireless local area network (LAN) connections, firewire connections, and/or other connections to a plurality of devices such as plain old telephones, IP based phones, television converters, for example, cable television (CATV) set top devices, televisions, digital televisions, high definition televisions (HDTV), video phones, and other devices. In exemplary embodiments, the broadband residential gateway 300 may support communications between any of the aforementioned devices in intra-premises calling and/or extra-premises calling. The BRG 300 takes an inventory of addresses of all connected apparatus and may report terminal capabilities to a call manager of an IP Central Station 200 (FIG. 2), as will be further discussed herein, to enable multimedia capabilities compatible with called party multimedia capabilities. Further, when the broadband residential gateway 300 is used in a business or government environment, it can function as a private branch exchange or key type telephone system.

In FIG. 1, broadband residential gateway 300 is illustrated as a single physical device. This configuration is appropriate where centralization of maintenance and control is desirable. Alternatively, the broadband residential gateway 300 may be separated into more than one physical device allowing functionality to be distributed to a plurality of different physical locations in the customer premise and/or broadband network 1. However, in many embodiments, having a centralized broadband residential gateway 300 located in a single location provides ease of maintenance, control, and re-configuration as well as a reduction in cost due to shared functionality. For example, the broadband residential gateway may be configured to provide the intelligence needed to allow each of the customer premises equipment devices to operate within the broadband network 1. For example, analog voice may be converted to digital data and packetized for transmission in an appropriate output protocol such as an Internet protocol (IP).

In exemplary embodiments, the broadband residential gateway 300 may function to couple devices within the customer premise equipment 102 to the rest of the broadband network 1 using any suitable broadband communication mechanism. In the embodiment shown in FIG. 1, the broadband residential gateway 300 utilizes a hybrid fiber-coaxial plant 112 to couple the broadband residential gateway 300 to the rest of the broadband network 1. The hybrid fiber-coaxial plant 112 may be preferred in many embodiments over other broadband communication mechanisms because of the large number of homes currently connected to cable networks, the capacity for shared access, and the ability for asymmetric data access speeds which allow high quantities of data to be distributed to the various devices in the customer premises equipment 112. The hybrid fiber-coaxial plant 112 may include coaxial cable and/or optical fiber networks in any suitable combination. The hybrid fiber-coaxial plant 112 may provide an intelligent broadband conduit between the broadband residential gateway 300 and a gateway such as the head-end hub (HEH) 115. The head-end hub 115 may be variously configured to provide various services and/or interconnections with the rest of the broadband network 1. For example, the head-end hub 115 may provide an interconnection point to gather and aggregate external services (for example, off air and satellite video, public switched telephone network voice, multimedia messages, and Internet data) for distribution to and from the hybrid fiber-coaxial plant 112. With respect to telephony and multimedia calls. the head-end hub 115 may function as intelligent conduit for connection and communication between the hybrid fiber-coaxial plant 112 and external networks such as an IP network 120 and/or an ATM/frame relay/cell relay network 185.

The broadband network 1 may include any number of interconnected head-end hubs 115, IP networks 120, and/or ATM networks 185. Further, the IP network 120 and/or ATM network 185 may be connected to one or more other networks and devices such as:

(1) external networks including a public switched telephone network (PSTN) 170, an signaling system 7 (SS7) network 170, an Internet 180, and/or a wireless network 144;

(2) various components including one or more private branch exchanges 146, terminals 142 including computers and wireless devices, and/or one or more stand alone broadband residential gateway 300;

(3) one or more administration centers 155;

(4) one or more secure network management data networks 190 such as a network operations center (NOC);

(5) one or more billing systems 195 such as OSS; and/or (6) one or more centralized control centers such as what is referred to as an IP central station 200.

The IP network 120 and/or ATM network 185 (examples of packet-switched networks) may include one or more routers and/or other devices to route, for example, telephony calls, multimedia calls, signaling messages, administrative messages, programming messages and/or computer data between the various devices in the broadband network 1 such as the head-end hub 115, the public switched telephone network 160, the private branch exchange (PBX) 146, as well as the other devices discussed above. In preferred embodiments, the information traveling in the IP network 120 may be packetized and formatted in accordance with one of the Internet protocols. The IP network 120 may also include gateways to interface with the various other networks and/or devices. For example, the gateways may be distributed at the edge of the IP network where the IP network interfaces with one of the other devices or networks. Alternatively, the gateways interfacing the IP central station 200 to, for example, the Internet 180, public switched telephone network (PSTN) 160, signaling system 7 (SS7) 170, wireless networks 144, ATM/frame/cell relay networks 185 may be provided in the IP central station 200, or in both the IP network 120 and the IP central station 200, and/or partially distributed between the IP network 120 and the IP central station 200. Where the gateways are separated by an IP network 200, an appropriate transport protocol may be utilized to logically connect the IP central station 200 to the particular gateway.

The IP central station(s) 200 may be connected to, for example, one or more IP networks 120, ATM networks 185, secure management data networks 190, and/or administration centers 155. The IP central station 200 may be variously configured to include one or more servers and/or one or more gateways. In exemplary embodiments, the servers and gateways provide the necessary intelligence and traffic management capabilities to enable information, for example, IP telephony signals, to travel through the broadband network 1. For example, the IP central station 200 may be configured to manage voice information transfer from the public switched telephone network 160, through the IP network 120, and into and out of one or more devices such as those connected to a broadband residential gateway 300. The IP central station may be configured to store various control and system information such as location, address, and/or configurations of one or more broadband residential gateways 300, as well as other routing and call set-up information.

In exemplary embodiments, one or more administration centers 155 may be connected to the IP network 120 and provide billing and local directory number portability administration. The local number portability may be handled by one or more Local Service Management System (LSMS) which may be included in the administration center 155 and/or in the IP central station 200. Further, the Secure Management Data Network 190 may also include a mechanism for transferring various information such as billing, call tracking, and/or customer service provisioning. Various existing systems may be utilized to provide this information such as existing billing systems (OSS) 195 and/or one or more network operations center (NOC). The network operations centers may be included in the administration center 155, the IP central station 200, and/or the billing system 195. The network operations center (NOC) may be variously configured to include a translation server to allow communications with the various disparate entities (for example, legacy systems) in the broadband network 1.

The IP network 120 and/or the ATM network 185 illustrated in FIG. 1 may include one or a plurality of sub-networks. Each of the sub-networks may include its own IP central station 200 in a distributed configuration, with certain routing data replicated across all IP central stations or each sub-network may be connected to a single centralized IP central station 200. Where the IP network 120 includes one or more sub-networks, each sub-network may be connected to multiple head-end hubs 115. Further, each head-end hub 115 may be connected to multiple hybrid fiber-coaxial plants 112, and each hybrid fiber-coaxial plant 112 may be connected to multiple pieces of customer premises equipment 102 and/or broadband residential gateways 300. The IP network 120 provides an interconnected broadband network which may be utilized to transport and route packetized information to and from diverse geographic locations and may be used on a national or international basis. Further, the IP network 120 and/or ATM network 185 may utilize private network facilities and/or may be provisioned over a shared network such as the Internet.

The IP central station 200 may be configured to provide connectivity for the broadband residential gateway 300 to the Internet 180 (for example, World Wide Web (www)), as well as connectivity to other external networks such as public switched telephone network 160 and signaling system 7 (SS7) 170 for end-to-end voice, multimedia, and data applications, for example voice over IP telephony. IP packets traveling through the IP network provide for priority so that, for example, voice packets may be typically given priority over data packets to maintain certain VoIP telephony QoS requirements. On the other hand, a leased line concept for packet traffic may have an even higher priority than a voice communication. According to the principle of the present invention, a user may change quality of service and their required bit rate and, hence, the priority of the communication in real time in response to user input. Thus, the system is sufficiently flexible so that the priority of a given communication can be dynamically altered according to customer preferences, variable billing rates and tariffs, the user's bit rate requirements, the user's desired quality of service, traffic patterns, and/or congestion.

A. Internet Protocol Central Station

Figure 2:
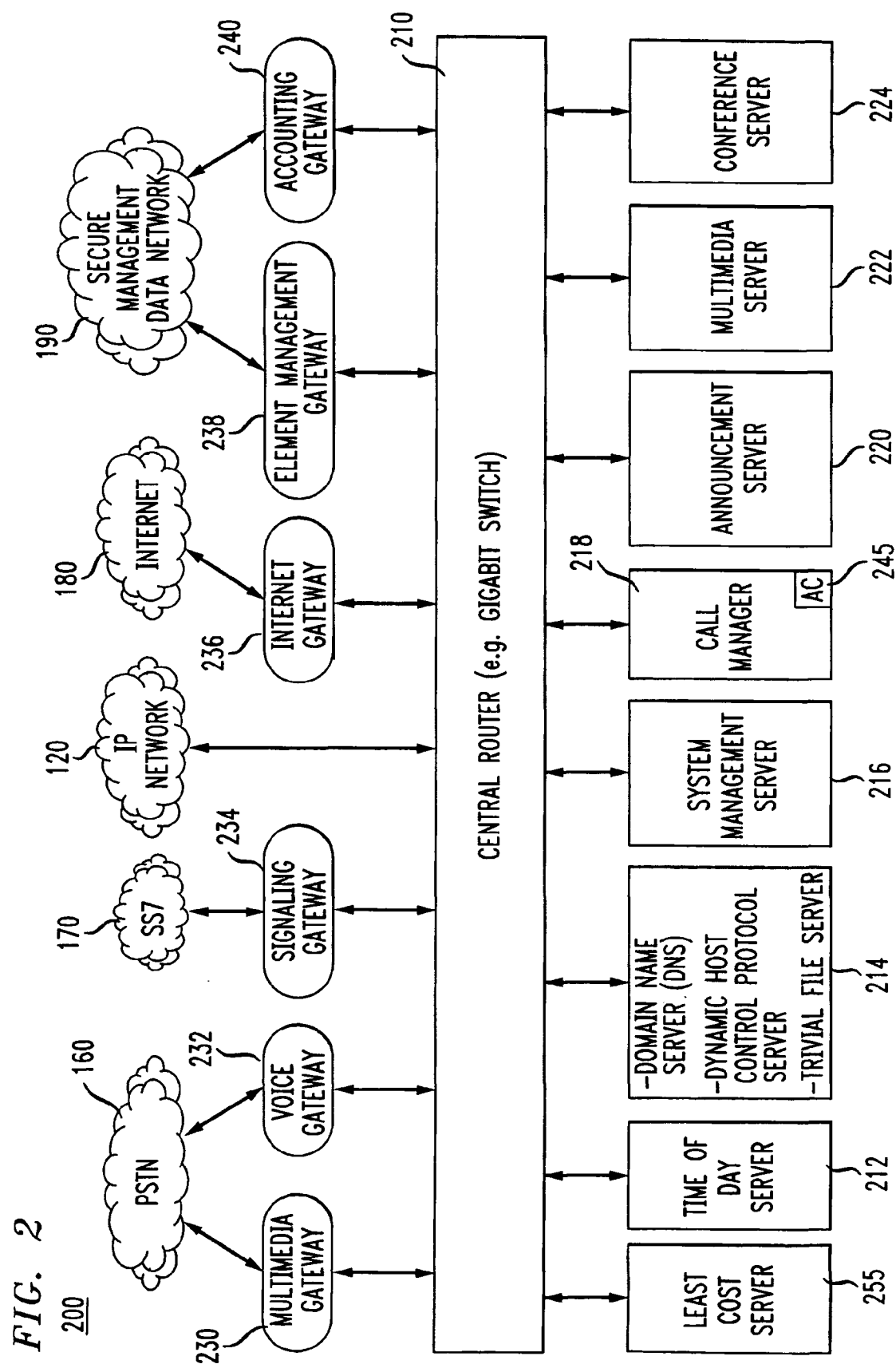
FIG. 2 shows a block diagram of a preferred embodiment of a centralized control (IP central station) in accordance with aspects of the present invention.

Referring to FIG. 2, the IP central station 200 may be variously configured. In preferred embodiments, it may be configured to ensure seamless integration of packet based communication system including the IP network 120 with the public switched telephone network 160, signaling system 7 (SS7) network 170, and the Internet 180 so that packetized data, for example, voice calls and information data, is properly transferred between the broadband residential gateway 300, the public switched telephone network 160 and/or the Internet 180. In one embodiment, the hybrid fiber-coaxial plant 112, head-end hub 115, and IP network 120, provide a virtual signaling conduit for packetized voice and data which may, with the coordination of the IP central station 200, be provided in the appropriate format between the broadband residential gateway 300 and the public switched telephone network 160 and/or Internet 180.

Again referring now to FIG. 2, the IP central station 200 may include a central router 200, for example, a gigabit switch, which may be utilized to interconnect various servers and gateways contained in the IP central station 200. The central router 210 provides for example Ethernet switching and aggregate traffic between servers, gateways and the IP network 120 and/or ATM network 185 backbone. In one exemplary embodiment, the central router 210 provides high-speed, non-blocking IP and IP multicast Layer 3 switching and routing. The IP central station 200 may include one or more of the following servers: the least cost server (LCS) 255, the time of day (TOD) server 212, the dynamic host control protocol (DHCP) server, the trivial file transfer protocol (TFTP) server, and the domain name service (DNS) server 214, the system management (SM) server 216, the call manager (CM) server 218, the announcement server (AS) 220, the multimedia server (MS) 222, and/or the conference server (CS) 224. As illustrated in FIG. 2, the servers may be separate servers, for example the call manager server 218, or may be incorporated into a single server. In the exemplary embodiment, the dynamic host control protocol server 131, trivial file transfer protocol server server 132, and the domain name service server 214 are each incorporated in a single server facility. Each server in the IP central station 200 may include computer(s), storage device(s), and specialized software for implementing particular predefined functions associated with each server. In this manner, the servers in the IP central station may be provisioned as a main server and one or more back-up servers to provide redundant processing capabilities. Similarly, the router may be implemented as a main router and a back-up router with similar routing functionality.

The IP central station 200 may also include, for example, one or more of the following gateways: an element management gateway (EMG) 238, an accounting gateway (AG) 240, an Internet (Boarder) gateway (IG) 236, a signaling system 7 (SS7)) gateway (SG) 234, a voice gateway (VG) 232, and/or a multimedia gateway (MG) 230. The IP central station 200 may utilize one or more of these gateways to provide centralized system intelligence and control of voice and/or data IP packets.

In exemplary embodiments, the dynamic host control protocol server and domain name service server 214 may operate to dynamically assign IP addresses to devices in the customer premise equipment 102. Where a dynamic IP assignment scheme is used, the customer premises equipment may be provided with one or a plurality of dynamic IP assignment when activated initially, and/or at the initiation of each active session. Where an IP address is assigned when the device is initially activated, it may be desirable to assign a single IP address to a single broadband residential gateway and assign a port address to devices connected to the broadband residential gateway 300. In other embodiments, an individual IP address may be assigned to each device coupled to the broadband residential gateway 300. For example, the broadband residential gateway may include and/or be coupled to one or more cable modems, IP phones, plain old telephone system phones, computers, wireless devices, CATV converters, video phones, and/or other devices which each may be assigned a unique static and/or dynamic IP address and/or a port of a one of these IP addresses. Each of these different terminal devices may have different capabilities for different multi-media services: the telephone is limited to voice telephony while a fully equipped personal computer (including a video camera and microphone) has full multimedia broadband capabilities. As will be discussed further herein, the user may request a communication that cannot be accomplished by the terminal configuration and the BRG may provide an appropriate error message suggesting the user move to another terminal and/or seek to obtain missing software.

The particular protocol for allocating IP addresses and/or ports may be specified using protocols defined in the dynamic host control protocol server 214. In exemplary embodiments, the dynamic host control protocol and DN server 214 may be configured to assign available IP addresses from address pools based, for example, on the identity or type of requesting device, the amount of use expected for the requesting device, and/or predefined assignment protocols defined in the dynamic host control protocol and DN server 214. The identifiers provided for given equipment and temporarily stored at a broadband residential gateway can be translated to provide capabilities for, for example, for high fidelity audio reception and transmission, high definition television reception or transmission and the like at a given user location within a residence, business or government location and thus reported to an IP central station 200 at call set-up. In centralized embodiments, it may be desirable to configure the call manager (CM) 218 to provide sufficient information such that the domain name service server 214 can distinguish between static IP devices, dynamic IP devices, registered devices, unregistered devices, and registered devices that have been assigned to a particular class of service for example, data vs. telephony, un-provisioned, vs. provisioned, etc.

The trivial file transfer protocol (TFTP) server 214 may be configured to transfer certain information to/from one or more broadband residential gateways 300. In exemplary embodiments, the trivial file transfer protocol server provides Data Over Cable Service Interface Specifications (DOCSIS) configuration information containing QoS parameters, terminal configuration and other information required for the broadband residential gateway 300 to operate optimally.

The time-of-day (TOD) server 212 may include a suitable facility for maintaining a real time clock such as an RFC868-compliant time server. In exemplary embodiments, the time-of-day server 212 provides system messages and/or responses to system inquiries containing a coordinated time, for example, universal coordinated time (UCT). The universal coordinated time may be used by any of the servers and/or devices in the broadband network 1. For example, the broadband residential gateway 300 may use the universal coordinated time to calculate the local time for time-stamping of communication processing, files and logs, including error logs.

The system management (SM) server 216 may include responsibility for the overall operational state and functioning of components the broadband network 1, either alone, or in combination with other system management servers 216. The system management (SM) server 216 may be variously configured to provide monitoring and administrative functions for devices within the broadband network 1. For example, the system management server 216 may be configured to provide management of various database functions, memory buffer functions, and software utility functions within the broadband network 1. Software management includes, for example, version control, generic control, and/or module control.

The least cost server (LCS) 255 may be variously configured to enable the system to determine alternative routes available for a communication and the least cost routing of telephone and data transmission throughout the network. In accordance with the present invention and as further discussed herein, the least cost server 255 may also provide one or more broadband residential gateway users the capability to select among, for example, service provider, data rate, cost and Quality of Service (QoS) as well as add or delete parties to/from a communication. The least cost server 255 coordinates with the TFTP server 214 to obtain remote terminal configuration data as necessary.

The announcement service (AS) server 220 may be variously configured. In exemplary embodiments, it may store and send announcements to specified destinations and/or all destinations based on instructions received by, for example, the call manager (CM) server 218. The announcement server 220 receives, for example, Media Gateway Control Protocol (MGCP) or later signaling (for example, H.GCP—an ITU standard Gateway Control Protocol) control messages from the call manager 218, and sends announcements to one or more voice gateways (VG) 232 and/or the one or more broadband residential gateway 300 (for example, using Real Time Protocol (RTP) packets). The announcement server 220 may send an announcement once, a predetermined number of times, or in a continuous loop. The announcement server 220 may detect when a phone or other device has been taken off-hook and play an advertisement or other announcement to the user. Where a user has signed-up for an advertising plan whereby phone rates are reduced in return for advertising revenue generated by the advertisements, the announcement server 220 may be utilized to track the number of individuals with a particular income, age, or other profile which hear the advertisement. The announcement server 220 may respond to requests from individual system devices such as one of the broadband residential gateways 300 and/or under control of, for example, the call manager 218. Where the announcement server is under control of the call manager 218, the call manager may be configured to control various operating parameters of the announcement server. For example, the call manager 218 may request that certain announcements are sent once, a specified number of times, or in a continuous loop.

In still further embodiments, announcements may be generated elsewhere in the broadband network 1, stored as files, and distributed to one or more announcement servers via a file transfer protocol or resource such as the trivial file server 214 using one or more file transfer protocols. In many embodiments, it is desirable to store announcements in an appropriate encoding format (for example, G.711 or G.729) within the Announcement Server. The announcement may have an audio component and/or a audio/video component. The audio/video component may be stored using a combination of an encoding format (for example, G.711) and/or a standard file format such as wave (WAV), MPEG, and other suitable formats.

In one exemplary method of operation, a user picks up a telephone which sends a signal to the call manager 218. Subsequently, the call manager 218 may establish a connection to the announcement server 220 and play one or more pre-recorded and/or predetermined announcement (hypertext and/or audio). Signaling tones such as dial tone, audible ringing tone, or a called party busy signal may be played by the broadband residential gateway 300 or the call manager 218, but Special Information Tones (SIT) and/or messages may also be included as part of an announcement file. In this way, the user experience is enhanced such that the user receives a busy message and/or hypertext announcement providing one of several options for contacting the called party. The announcement server 220 may have information entered by a user using, for example, a broadband residential gateway 140 to provide additional information to the called party. The additional information may include the ability to leave a message, type-in a chat note, page the called party, barge-in on the call, and/or other user or system defined call handling capabilities.

The announcement server 220 may also be programmed with various system messages such as an announcement indicating that a number dialed is incorrect or that the call did not go through as dialed, that the lines are busy, that all lines between two countries are currently busy, that the called party has changed numbers, that the called party's phone has been disconnected, that one or more system errors have occurred, and/or other announcement messages.

The call manager (CM) 218 may be variously configured. In exemplary embodiments, the call manager 218 provides a centralized call control center for supporting call set-up, call change and tear-down in the broadband network 1. The call manager 218 may be configured to include trunk and line information maintenance, call state maintenance for the duration of a call, and/or user service features execution. The call manager 218 may also provide for call processing functions such as a standardized call model for processing the various voice connections such as voice over IP calls. In exemplary embodiments, a standardized "open" call model may be utilized which supports standardized application programming interfaces (APIs) to provide transport services and other user functions such as calling cards. An open application programming interface and call set-up interface in the call manager will enable third party applications to be loaded into the call manager 218 and broadband residential gateway 300. This will facilitate the development of third party applications for enhancing the functionality of components in the broadband network 1. For example, third parties and other equipment vendors may manufacture various broadband residential gateways 300 for use in the broadband network 1 by writing applications to support the open call model of the call manager 218. The call manager 218 and/or broadband residential gateway 300 may also be configured to execute and/or accept commands form a standardized scripting language which may generate instructions for the call manager 218 and/or broadband residential gateway 300 to execute various functions. The scripting functionality may include the ability to execute an entire call model including interfaces to the signaling system 7 (SS7) 170, public switched telephone network 160, IP network 120, ATM/frame/cell relay network 185, and/or other functions within, for example, IP central station 200 such as the multimedia server 222, announcement server 220, system management server 216, conference server 224, time of day server 212, least cost server 255, and/or domain name server 214.

The call manager 218 may also be configured to maintain the call states for each call it handles (for example, a voice over IP call) and respond to system events created by, for example, the multimedia gateway control protocol (MGCP) messages and/or integrated services digital network user part (ISUP) messages for signaling system 7 (SS7) protocol that may occur during the processing of a call. Exemplary events handled by the call manager 218 include call state changes, call feature changes/call feature triggering events, changes in the status of lines and trunks, and/or error conditions. Further, the call manager 218 may interact with devices connected to a single circuit on the public switched telephone network 160 and/or a device connected to a port of the broadband residential gateway 300. In this manner, new devices may be added to the infrastructure and operate using the open call model contained in the call manager 218.

The call manager 218 may also include storage for subscriber and network configuration, a cache server for faster access to frequently used data, a routing engine for selecting an appropriate routing algorithm (for example, least cost, best quality of service routing), and/or a service broker which provides the data and logic for specific services. In addition, the call manager 218 may include an authentication (AC) server 245 that provides authentication of various devices, objects, packets and users in the integrated multimedia system. Typically, a user carries a subscriber identity module including preferred terminal configuration data, their identity, personal profile and default qos and call set-up parameter data. In this manner, a user may verify the identity of the calling or called party.

The call manager 218 may interact with the signaling gateway (SG) 234, the accounting gateway (AG) 240, the element management gateway (EMG) 238, the voice gateway (VG) 232, and the multimedia gateway (MG) 230 using any suitable protocol such as IP and an interconnection mechanism such as the central router 210. In one preferred embodiment, the call manager 218 may be configured to utilize signaling messages such as: a) ISUP messages over Common Object Broker Architecture (COBRA) interface to and/or from signaling gateway 234, b) MGCP, SIP—simple internet protocol, H.GCP, and/or other suitable control messages to and/or from the announcement server 220, c) call event records in modified Radius format to the accounting gateway 240, d) Radius (or Enhanced Radius or compatible protocol) control messages to and/or from the voice gateway 232 and/or the broadband residential gateways 140, 300, and e) signaling network management protocol (SNMP) messages to and/or from the element management gateway 238.

The call manager 218 may incorporate one or more databases. For example, the call manager 218 may include database information such as (1) a resources database that provides an identification of what resources are connected to the broadband network 1 and their current state; (2) a trunk/gateway database that indicates which gateway serves what circuits in a trunk; (3) a customer database including a user's personal profile which indicates whether a call is authorized, identifies what services a line supports and determines whether a telephone number is on or off the integrated IP communication network; (4) a numbering plan/least cost routing database which provides routing information that enables the IP central station 200 to choose the correct trunk as a function of the called number; and (5) a local number portability (LNP) database that indicates the North American Numbering Plan (NANP) and associated prefixes which are open for association with the number portability service; and (6) an address of the service control point (SCP) towards which requests for translating these local portability numbers should be routed.

In exemplary embodiments, the broadband network 1 includes equipment compatible with the COBRA standard. COBRA may be utilized to allow applications from a plurality of vendors to operate with each other. The COBRA standard allows a company, such as AT&T, to build its network using multi-vendor equipment and yet ensure seamless integration and operation. Some of the major areas covered by COBRA v. 2.2 includes: Inter-ORB Bridge Support, General Inter-ORB Protocol (GIOP) support, Internet Inter-ORB Protocol (IIOP) support, and Environment Specific Inter-ORB Protocol (ESIOP) support. The call manager 218 may integrate these protocols to facilitate call set-up with diverse equipment. This is advantageous in that equipment from a plurality of vendors may interoperate over the broadband network 1 without modification.

The multimedia server (MS) 222 may be variously configured. For example, one or more multimedia servers may provide support for multimedia messaging service and/or the overall management of multimedia voice and mail messages transmitted across the broadband network 1. The multimedia server 222 may be configured to support e-mail (for example, html) messages, voice mail (audio) messages, and/or video mail (audio and video) messages. The multimedia messages may include standard pre-configured system messages, advertising messages, and/or user defined messages. In either event, where the messages are stored in a centralized location, the multimedia server may provide such storage. Where the multimedia server 222 provides storage for the multimedia messages, a database may be utilized for indexing, storage, and retrieval of such messages. In exemplary systems, the user may access predetermined ones of these messages. The multimedia server 222 may utilize IP as a method of communicating with other devices across the broadband network 1.

The conference server (CS) 224 may be configured to provide for multiparty conference calls using, for example, IP voice packets during an IP telephony or multimedia session call (for the latter, the conference server coordinates with the multimedia server). The conference server 224 may include specialized software that runs on a computing platform having associated multiplexing and demultiplexing capability for segregating and aggregating user information packets. For example, the conference server may log several calls into a conference session. When information packets are sent from one or more phones, they are aggregated and sent to the other terminals on the conference call, depending on their capabilities for multimedia transmission and/or reception. The conference server 224 may use any suitable communication protocol such as H.GCP or SIP. The conference server 224 may function to aggregate user information from two or more users onto a single call path. The conference server 224 may include one or more "call-in numbers" and be controlled from any location, for example, a centralized operator location and/or one or more broadband residential gateways 300 or IP central stations. According to the present invention, a called party may be added to/deleted from a call and given/denied call privileges in real time in response to user input via the broadband residential gateway and the call manager of the IP central station. It may be desirable to have the conference server 224 configured such that some called parties simply monitor the call without voice interruption while other callers have both voice transmit and receive capabilities. Where a caller is not given the privileges associated with active participation in the call, data packets from these users are discarded. For example, a CEO may have a multimedia conference call with a plurality of financial advisors and invite the press to listen on the call and have multimedia access without interruption capabilities. As will be further discussed herein, the resources available for various called parties (high fidelity audio transmission/reception, high definition video transmission/reception) may be provided at call set up by polling a BRG for terminal configuration information or identification verification of a called party or during a call as it is desired to add a called party to a call.

The gateways in the IP central station 200 may be configured to provide translation of signals to and/or from the various servers in the IP central station 200, the IP network 120, the public switched telephone network 160, the signaling system 7 (SS7) network 170, the Internet 180, and/or the secured management data (SMD) network 190. The gateways typically support one or more of the following group of functions: call processing; signaling system 7 (SS7) connectivity; billing support; OAM&P support; connection to public switched telephone network; control CoS/QoS parameters; and enhanced services.

The voice gateway (VG) 232 may be connected to the public switched telephone network 160 and operate to convert between IP based voice packets and standard public switched telephone network 160 voice traffic. Voice gateway 232 may be configured as multi-frequency (MF) or ISUP gateways on a per-T1 basis. Where multi-frequency (MF) trunks are used, one embodiment utilizes signaling between the call manager 218 and the voice gateway 232 using MGCP, SIP, H.GCP and/or other compatible protocol. Multi-frequency trunks may be compatible with Feature Group D (FGD), Operator Service (OS) Signaling protocol and/or Termination Protocol (TP).

The IP central station 200 may be variously connected to the public switched telephone network. For example, the IP central station 200 may be connected directly to the public switched telephone network using, for example, a bearer channel (for example, a T1 or T3 carrier) and/or interconnected using one or more networks such as an IP network and/or ATM/frame/cell relay network 185. Where a T1 network is utilized, it may be desirable to utilize one or more of ISUP or MF, FGD, and OS to interconnect a service bureau in the public switched telephone network 160. Alternatively, the service bureau in the public switched telephone network 160 may be interconnected using an alternative network arrangement such as an IP network 120 and/or a ATM/frame/cell relay network 185. The service bureau may coordinate with the IP central station 200 in providing operator services, directory services and provisioning for 311, 611, and 711 services. Emergency 911 services may be routed to an E911 tandem switch that has the appropriate databases and interfaces with a Public Safety Answering Position (PSAP). Emergency 911 services may be coordinated by the call manager 218 and/or public switched telephone network based service bureau.

Voice gateway 232 may be router-based and include one or more voice feature cards and/or DSP Module cards to perform voice processing. The voice gateway 232 may optionally include host processors, LAN/WAN ports, Ethernet ports, T1 or E1 telephony interface cards, Voice Feature Cards with DSP Modules providing voice compression transcoding (G.711 and G.729), carrier-quality echo cancellation with 8 ms-32 ms tail length, a de-jitter buffer which adapts to delay variations in the network in order to minimize the delay, packet loss concealment that generates concealment frames for lost packets using information from previously received data, and/or tone detection and generation. This function detects Multi-Frequency (MF) tones and generates MF and call processing tones (for example, dial tone, call-waiting tone etc.).

In exemplary embodiments, the voice gateway 232 may include T1/E1 interfaces with internal Channel Service Units (CSUs). It may also be desirable to configure the voice gateway 232 such that ISUP, MF and Centralized Attendant Services (CAS) trunks are supported with a configuration done on a per T1 basis. Additionally, multi-frequency tones and Centralized Attendant Services may utilize a "robbed bits" communication scheme where bits are "robbed" from sub-frames to transmit in-band signaling. The multi-frequency tones may be converted to and/or from, for example, simple gateway control protocol (SGCP) signal requests and events by the voice gateway 232. For example, multi-frequency tones and/or lower level signaling and timing functions may be translated to and/or from any of the following indications: simple gateway control protocol Notify functions, simple gateway control protocol Notification Requests, Connection requests, Modify Connection requests, off-hook and/or on-hook indications.

An Ethernet interface with a RJ-45 connector may be used to connect the voice gateway 232 to the central router 210 (for example, Gigabit Switch or High Speed Router (HSR)). The multimedia gateway control protocol may be used as the interface between the voice gateway 232 and the call manager 218. For example, call control, signaling, and multimedia data stream, real time protocol (RTP) connections. IP addresses, UDP ports, codec choice etc, may be configured in any suitable manner such as by using a multimedia gateway control protocol. In exemplary embodiments, audio streams may be passed directly between customer premises equipment 102 using real time protocol connections over, for example, a user datagram protocol (UDP). Thus, the multimedia gateway control protocol may be utilized to request the voice gateway 232 to initiate, cancel, and/or otherwise modify connections in order to set up and tear down RTP media streams. A similar procedure may also be utilized to request continuity tests and results.

In exemplary embodiments, it may be desirable to adapt the IP network to carry signaling system 7 (SS7) Transaction Capabilities Application Part (TCAP) messages over the IP network 120 and/or the ATM/frame/cell relay network 185. The transport of signaling system 7 (SS7) transaction capabilities application part (TCAP) messages over the packet networks allows signaling operations to be supported by multiple connections to the same host, multiple host connections, and distributed processing of call set-up information using, for example, multiple call managers 218 in the broadband network 1. Thus, the IP network 120 and/or ATM/frame/cell relay network may be utilized to interconnect a plurality of ESS switches to transport signaling information, voice, and/or data. In embodiments where the signaling gateway (SG) 234 is configured to support signaling system 7 (SS7) signaling transport using transaction capabilities application part (TCAP) messages, it may be desirable to include a translator for converting between multimedia gateway control protocol (MGCP) messages and transaction capabilities application part (TCAP) messages and/or ISDN User Part (ISUP) messages.

The point where ISUP and TCAP messages are terminated at a signaling system 7 (SS7) signaling gateway is defined as a Service Switching Point (SSP) to the signaling system 7 (SS7) network 170. The call manager 218 may be configured with a standardized Application Programming Interface (API) to allow interaction with the signaling system 7 (SS7) by, for example, sending and/or receiving ISUP and TCAP messages from a service switching point (SSP). Full class 5 signaling system 7 (SS7) functionality may be included in the call manager 218 including the ability to provide all of the information necessary for billing as defined in the GR-246-Bellcore standard. The signaling gateway 234 may be arranged to perform: signaling system 7 (SS7) message handling (message discrimination, message distribution, and message routing); signaling link management (for example, link activation, deactivation); signaling route management (managing Point Code [PC] route status based on route received management messages such as Transfer Prohibited, Transfer Allowed, Transfer Restricted, etc.); and signaling traffic management (diversion of traffic based on unavailability, availability, restriction of signaling link, route, and Point Code.) The signaling system 7 (SS7) architecture supports the necessary redundancy component scheme for system reliability and availability during scheduled maintenance and/or software/hardware upgrades. The signaling gateway 234 may be configured to directly provide for lower level signaling system 7 (SS7) processing.

In exemplary embodiments, the signaling gateway 234 interacts with the call manager 218 using an appropriate open interface (for example, Common Object Request Broker Architecture (COBRA)). In these embodiments, it may be desirable for translation software in the signaling gateway 234 to add Message Transfer Part (MTP) layer information to the ISUP and/or TCAP data to create a complete signaling system 7 (SS7) message. The complete signaling system 7 message may then be sent to the Signaling Transfer Point (STP) in the external signaling system 7 (SS7) network 170. Conversely, the signaling gateway 234 may be configured to remove ISUP or TCAP application layer data from the signaling system 7 (SS7) messages received from the STP prior to converting the information to an appropriate open interface (for example, COBRA) and forwarding the information to the call manager 218 via the central router 210.

The accounting gateway (AG) 240 may be configured to receive messages representing events from the call manager 218 via a suitable transport mechanism such as the central router 210. Typically, two messages are received for each call, the first when the call is established, and second when the call terminates. In accordance with the present invention, messages are also generated in real time in response to user input when there is a change, for example, of required bit rate, quality of service, preferred service provider for a segment of the communication or to add/delete parties to a call. In the case of unsuccessful calls, a failure message will be logged. The messages provide details about the calling and called parties, the timing of the call set-up, the duration, the data rate and the quality of service delivered for each segment of the call. Accounting gateway 240 may be duplicated using a redundant computer, with each gateway having dual-mirrored disks. The accounting gateway 240 stores usage records and may then distribute them to linked destinations (for example, billing centers) for processing. Billing centers typically include bill processors that receive accounting information from the accounting gateway 240 and generate appropriate on-line or paper billing to customers. The accounting gateway may be configured to accommodate multiple days worth of accounting records such as the records for one day, two days, three days, four days, a week, or a month. The period in which the data is retained in the accounting gateway may be dependent on business needs, hardware restrictions, and/or the billing cycle. For example, as the end of the billing cycle nears, it may be desirable to shorten the period the accounting gateway holds the data such that calls placed the day the bills are printed are included on the bills. Further, the accounting gateway may both retain and forward data to the billing centers. In this manner, if the equipment at the billing center fails, the accounting gateway 240 may serve as a backup. Similarly, the billing center may act as a backup where the accounting gateway 240 fails.

An Automatic Message Accounting (AMA) format is typically used by circuit-switching systems, packet-switching systems, and other network elements to provide billing usage measurements data (for example, the Bellcore® Automatic Message Accounting Format (BAF)). This data may be utilized either to permit charging the customer for use of network resources or to permit charging other carriers (for example, InterExchange Carrier (IEC) and other Local Exchange Carrier (LEC)) for assistance in placing or changing characteristics of call connections. In accordance with the present invention, the normal AMA format and associated processes may be modified to additionally report time stamped entries and data for actual changes in provided bit rate, quality of service, parties to a communication and/or preferred service provider for billable and non-billable segments (assuming Internet telephony and usage billing remains free of charge on a per unit of time basis). The accounting gateway 240 may be configured to convert this information into an Automatic Message Accounting Format (AMA) Format (for example, BAF) records and send these records to the external billing systems using, for example, a TFTP (trivial file transfer protocol). Time-stamp accuracy is typically based on the accuracy of the call manager 218 clock which may be derived from the TOD 212 server. To create appropriate AMA records, the event information produced by the call manager 218 preferably has appropriate information for the telephone service specified such as phone number of the calling party (customer), phone number of the called party(s) (customer), time of day of call or any changes, duration of the phone call or call segments, if more than one network route, bit rate or quality of service is provided for a communication and use of any discretionary features such as conferencing. Different AMA structures may be generated between On-Net calls (defined as within a network service provider IP network 120) vs. Off-Net calls (defined as outside of service provider IP network—for example, public switched telephone network) for billing purposes.

The element management gateway (EMG) 238 may provide system management functionality that includes, for example: a) status and performance monitoring for the Operation Administration, Maintenance, and Provisioning center, to gauge the ongoing operation of applications; b) extensive information exchange with a network operations center responsible for ongoing maintenance of one or more applications; c) customizable operations interface to allow the network operations center to view only information required, thus reducing the time spent filtering information; d) centralize distributed application configuration allowing for the centralized configuration of objects residing on a plurality machines; e) proactive network management capabilities to remove the need for constant operator intervention making the day-to-day operations more efficient; and/or f) intelligent display of status information to separate critical issues from low-priority problems allowing the operation center to assign resources to the right problems at the right time.

The multimedia gateway (MG) 230 may be configured to connect to the public switched telephone network 160 and to convert IP based multimedia packets into standard public switched telephone network 160 traffic. The multimedia gateway 230 may include an intelligent trunking interface that communicates with the call manager 218 for automatic trunk sizing and allocation between the IP network 120 and the public switched telephone network 160. For example, when an system user at the customer premises is using a PC and/or a multimedia phone to communicate with a traditional public switched telephone network 160 user, the communication session involves the transmission of video and audio data. The bandwidth that is required for this type of communication is much greater than that required for a PSTN-to-PSTN voice call or an IP-to-PSTN voice call. The multimedia gateway 230, as the interface between two systems, may negotiate a larger bandwidth (proportional to data rate) to facilitate the call if the called party is also video enabled. This bandwidth negotiation process typically occurs with a 5ESS or a Local Digital Switch within the public switched telephone network 160. Typically, a multimedia call, including live video, audio and data, will require greater bandwidth than a voice call supporting a bit rate ranging from 56K to greater than or equal to 1.544 Mbps. However, as the number of users sharing the same link grows, the quality of the transmission deteriorates significantly. The multimedia gateway 230 is able to monitor bandwidth (data rate) usage and actual quality of service and make appropriate adjustments so as to maintain a user selected or default quality of service. Further, it may be desirable for the call manager 218 and the multimedia gateway 230 to communicate between themselves and/or the customer premises equipment 102 to determine whether the user has authorized the additional data rate or a higher quality of service and hence expense of the call. For example, even where a called and/or calling party is video enabled, the user may nonetheless refuse to authorize payment for the increased bandwidth necessary for video.

The Internet gateway (IG) 236 may be connected to the Internet (for example, World Wide Web (www)) and provide a means for IP based data packets to be routed between the IP network 120 and the Internet 180. Alternatively, IP based voice packets may be routed via the Internet 180. In exemplary embodiments, the Internet gateway 236 routes data-only packets which share the same priority level with other lower priority, non-real-time traffic consistent with computer data communications presently experienced with the Internet 180. Consequently, low priority and low latency data traffic on the IP network 120 utilize the Internet gateway 236 to communicate with other IP data networks such as the www. Voice packets may be routed through another network such as the ATM/frame/cell relay network 185, a private IP network 120, and/or the public switched telephone network 160 where committed information rates may be easily obtained.

In exemplary embodiments, the broadband network 1 includes the interfaces which enable connections to existing Operation, Maintenance and Provisioning (OAM&P) 195 systems that support, billing, accounting, provisioning and/or configuration management functions. A Secured Management Data (SMD) Network 190 may be utilized to connect the OAM&P 195 to the accounting gateway 240 and element management gateway 238. The Secure Management Data network 190 may include a Network Service Division's NSD Net. The Secure Management Data network 190 helps ensure that only secure communication can occur between the IP central station 200 and the OAM&P 195. This eliminates one potential means of tampering with the billing and provisioning functions in the OAM&P. The billing systems (OSS) 195 may include the Network Operations Center (NOC). The NOC may include a translation server which includes functions for allowing communications and control of diverse networks.

B. Broadband Residential Gateway (BRG)

Figure 3:
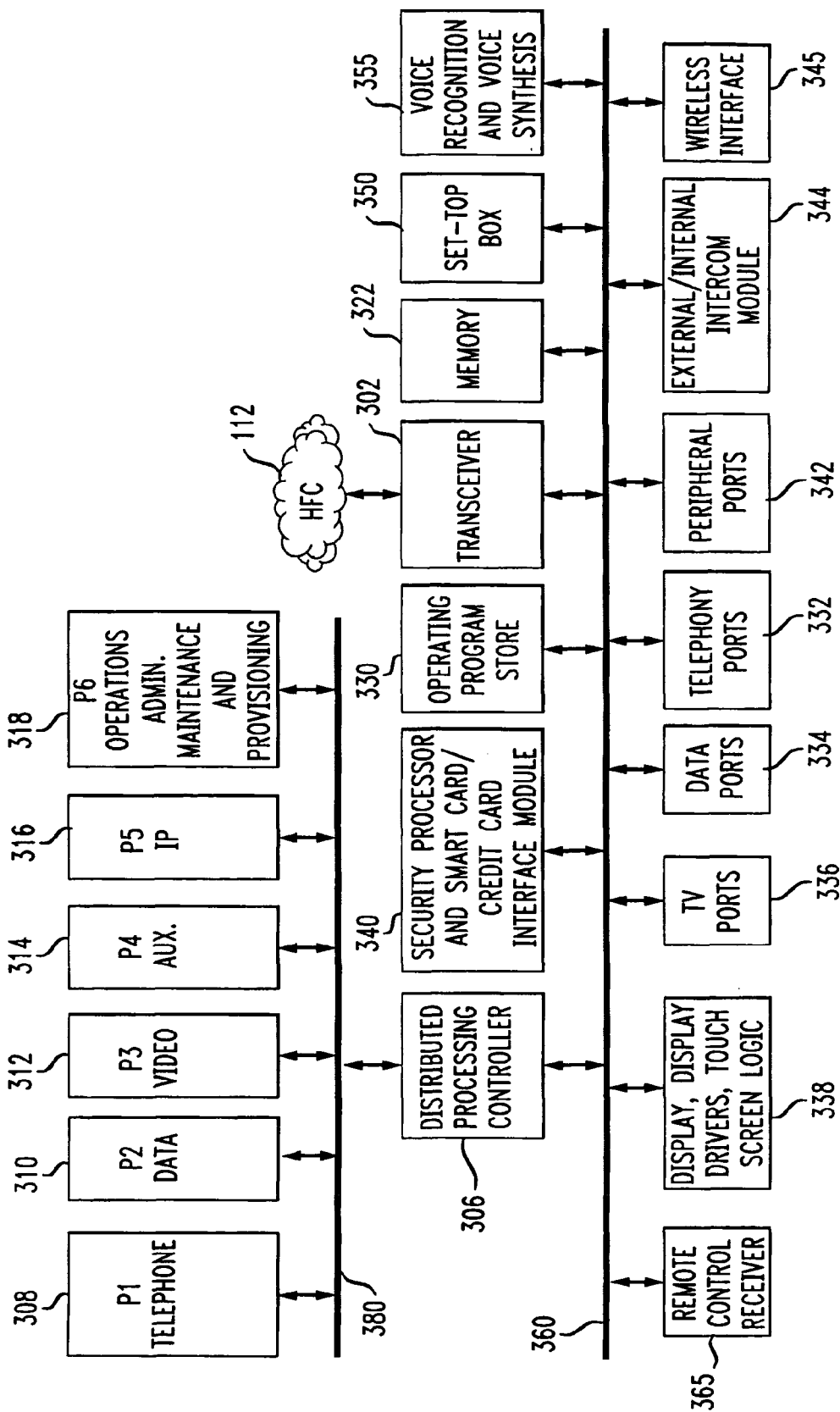
FIG. 3 shows a block diagram of a preferred embodiment of a local control apparatus (broadband residential gateway) in accordance with aspects of the present invention.

Referring to FIG. 3, a preferred embodiment for a broadband residential gateway (BRG) 300 will now be described and explained. The broadband residential gateway 300 may be configured as the interface unit between the remainder of the customer premise equipment 102 devices and the external network. The broadband residential gateway 300 may be connected to the remainder of the broadband network 1 using any suitable mechanism such as a gateway directly into an IP network and/or a cable connection. In the most preferred embodiments, a hybrid fiber-coaxial plant connection is utilized such as hybrid fiber-coaxial (HFC) plant 112. The hybrid fiber-coaxial plant 112 allows numerous broadband residential gateways 300 to be included on an existing hybrid fiber-coaxial plant 112 without modification to the plants infrastructure.

The broadband residential gateway 300 may be variously configured to, for example, provide high-speed cable modem capabilities to interconnect one or more associated PCs with each other and with the remainder of the broadband network 1, provide functionality to one or more TVs (using, for example, either an integrated or separate decoder functionality, for example, set top box 350), one or more telephone connections such as plain old telephone service (POTS) phones and/or digital telephones, displays, wireless interfaces, voice processing, remote control interface, display interface, and/or administrative functions. In exemplary embodiments, the broadband residential gateway 300 may a) providing conversion between analog voice and IP voice packets, b) multiplexing/demultiplexing streams of IP voice packets, c) supporting multiplexing/demultiplexing of multiple incoming and outgoing signals including multiple voice, multimedia, data, system administration, and/or TV information signals.

Where the elements of the broadband residential gateway 300 are interconnected, the interconnection may be provided by one or more data buses, for example, a high speed bus (HSB) 360, processor bus 380, and/or other interconnection system. The high speed bus 360 380 may be configured to provide a flexible conduit for transferring information between the internal hardware, processors and ports. In exemplary embodiments of the broadband residential gateway 300, the high speed bus 360 may include one or more of the following functional units a) a universal remote control receiver module 365 for receiving wireless (for example, infrared, and/or RF) signals (for example, keyboard signals and/or remote control signals) for control of the broadband residential gateway 300 and/or any connected devices, b) a display, display driver, touch screen logic module for driving one or more local and/or remote displays for interfacing with the broadband residential gateway 300 and/or one or more connected devices, c) one or more TV port modules 336 for interconnecting televisions, set-top devices, and/or other audiovisual devices to the broadband residential gateway 300, d) one or more data port modules 334 for connecting/interconnecting data enabled devices (for example, personal computers, palm top devices, etc.), e) one or more telephony port modules 332 for interconnecting one or more analog and/or digital telephones, f) one or more peripheral port modules 342 for interconnecting one or more peripheral devices such as disk drives, data storage devices, video cassette recorders, DVD devices, audio devices, video devices (for example, camcorders, digital cameras, digital video recorders, stereos, etc.), g) one or more external/internal intercom modules 344 for interconnecting remote intercom and/or security monitoring devices, h) one or more wireless interface modules 345 for interconnecting with various wireless extension devices such as wireless TVs, cordless and/or wireless telephones, wireless LANs, etc., i) one or more voice recognition/voice synthesis modules 355 for generating voice announcements, voice messages, and voice prompts and for recognizing voice generated commands and data, j) set-top box module 350 for performing the functions typically associated with a CATV set-top box locally and/or for communicating with one or more remotely coupled set-top boxes, k) memory 322 (for example, DRAM, RAM, flash, and/or other memory) for storing information and operating data within the broadband residential gateway 300, l) transceiver 302 for communicating with one or more external broadband networks m) operating program store 330 (for example, ROM, flash, etc.) for storing at least portions of the operating programs for the broadband residential gateway 300 and/or interconnected devices, n) security processor, smart card and/or credit card interface module 340 for providing secure processing functions and/or credit card/smart card transaction functions, and/or o) distributed processing controller 306 which may be a microprocessor and/or one or more interconnected distributed processing modules for controlling the broadband residential gateway 300. Where the distributed processing controller 306 includes one or more distributed processing modules, the modules may include a telephony processing module (P1) 308, data processing module (P23) 310, video processing module (P3) 312, auxiliary processing module (P4) 314, IP processing module (P5) 316, and/or an operations administration maintenance and provisioning processing module (P6) 318 interconnected through one or more busses such as processor bus 380. The processor bus 380 and/or high speed bus 360 may include any suitable interconnect bus including intelligent bus configurations incorporating smart buffer logic (not shown in FIG. 3) to facilitate data transfer between interconnected processors and/or modules. The various modules and/or processing components of the broadband residential gateway 300 may be powered by, for example, a power supply unit (not shown). Each of the individual modules of the broadband residential gateway will now be described in more detail.

The transceiver 302 may include circuits for converting digital signals to and from RF signals suitable for transmission across a broadband network such as the hybrid fiber-coaxial plant 112. The transceiver 302 may include one or more input/output ports such as a cable interface (for example, an F connector cable connection) and/or a fiber optic interface connected to a communication media (for example, hybrid fiber-coaxial Plant 112). The transceiver 302 may be compatible with the DOCSIS 1.0 or later specifications. For signaling purposes, the broadband residential gateway 300 may be compatible with the Media Gateway Control Protocol (MGCP) or other compatible signaling protocol (for example, SIP or H.GCP) to support telephony applications. The transceiver 302 may serve as a modem, a translator and/or a multiplexor/demultiplexor. Data received from the network may be de-multiplexed and placed on the data bus for dispatch to the appropriate peripherals and/or ports. Data from the various ports and peripherals may be multiplexed together for distribution over one or more broadband networks (for example, the hybrid fiber-coaxial (HFC) plant 112). Where a hybrid fiber-coaxial plant 112 is utilized, the data may be multiplexed onto various frequency bands of the hybrid fiber-coaxial plant 112 in a continuous data stream(s) and/or packetized data stream(s). To facilitate data transfer for various networks, the transceiver 302 may be include one or more registers for data queuing and/or IP tunneling of data packets across the broadband network.

Although the illustration of a display, display drivers, and touch screen logic device 338 suggests that the a display is integral to the broadband residential gateway 300, alternative embodiments of the broadband residential gateway 300 may provide a user interface via the TV screen, PC screen, video telephone, and/or other display device in addition to, or in lieu of, a display integral to the broadband residential gateway 300.

The peripheral ports module 342 may include a plurality of ports providing connectivity to external peripherals. Exemplary interfaces include, PCI, Firewire, USB, DB25, etc. Devices which incorporate one or more of these interfaces may utilize the broadband residential gateway 300 to interconnect to the remainder of the broadband network 1. The exemplary screen portions depicted herein for providing alternate routing, bit rate, quality of service, or features may be displayed on any of these display types and user data entry may be collected via various data input means including touchscreen, keyboard, mouse or voice input.

The external/internal Intercom Module (IM) 344 may include one or more microphones/speakers, voice CODECs, telephony processors, and/or interface ports. Where an intercom module 344 is utilized, the built-in circuitry may be configured to detect, for example, unused plain old telephone system telephone(s) and generates a special intercom tone on these unused telephones. In this manner, existing plain old telephone system telephones, digital phones, and/or other devices may serve as an intercom throughout the residence. The controller 306 (for example, such as the P1 telephony processor 308) may function to command the intercom module 344 to determine an appropriate intercom path to select an intercom connection between various locations. In exemplary embodiments, the CODEC may be configured to convert the analog voice signal into IP packets for transmission over one or more data ports 334, TV ports 336, display modules 338, telephony ports 332, peripheral ports 342, external/internal intercom ports 344, wireless interface ports 345, and/or set-top boxes 350.

In yet further embodiments, multiple broadband residential gateways 300 may be configured through, for example, IP tunneling, to set-up an intercom connection between multiple remote broadband residential gateways 300. In this manner, an administrative assistant at the office may be contacted via an intercom connection present at the users home. Thus, one or more individuals disposed at either local and/or remote locations with diverse types of equipment may communicate as an intercom group without the need to communicate via normal dialing procedures.

In addition to intercom services, the intercom module 344 may also configure intercom services for other telephony services (for example, extension transfer, call conferencing, internal caller ID), high speed data services (for example, LAN connections), facsimile transmission/reception, e-mail transmission/reception, video conferencing, and/or CATV/HDTV (Cable Television/High Definition Television) using standard industry protocols such as DOCSIS 1.0 or higher and IP tunneling transmissions. These services are advantageous in that once configured, the user may simulate a work environment in his home.

Though processing may be accomplished by a single processor performing all functions (for example, processing controller 306), in the preferred embodiment shown in FIG. 3, the architecture employs a distributed processing controller 306, and a plurality of processors P1-P6 308-318. In the distributed processing architecture, each of the plurality of processors P1-P6 may be configured to have a dedicated function to provide predetermined services or applications. The processors may be coupled together via any suitable mechanism such as the processor bus 380 and/or high speed bus (HSB) 360. The first processor P1 308 may include telephony applications such as call set-up, call re-routing, qos or data rate changes, call tear down, and other call functions; the second processor P2 310 may include management functions such as distribution and coordination of data within the various devices of the broadband residential gateway 300; the third processor P3 312 may include video processing functions for configuring control panels, screen displays of attached devices, video conference calls, MPEG decoding functions and other video processing functions; the fourth processor P4 314 may include an auxiliary processor for off loading special processing functions such as numeric processing; the fifth processor P5 316 may include interface input/output processing (for example, text to voice and vise versa) and/or Internet protocol (IP) processing functions for configuring data to communicate with the remainder of the broadband network 1 and/or devices attached to the broadband residential gateway 300 such as IP telephones or IP enable PCs; and the sixth processor P6 318 may include processing functions for Operation, Maintenance and Provisioning (OAM&P) processing. Each of the above processors may be an entirely separate processing unit with included RAM, ROM, Flash memory, or may share RAM, ROM, and/or Flash memory. Where shared RAM, ROM, and/or Flash memory is utilized, the memory may be located within the distributed processor controller 306 and/or on the processor bus 380. Alternatively, the memory may be integrated into the operating program store 330 and/or into memory 322.

The Distributed Processing Controller 306 with its associated processors (P1-P6) may be coupled to the various elements of the broadband residential gateway 300 so as to enable proper operation of each of the individual components. For example, the distributed processing controller 306 (with any associated processors (P1-P6)) may also coupled to the security processor, smart card/credit card, and interface module 340, the peripheral port(s) module 342, and/or the External/Internal Intercom Module 344 for providing control and coordination among devices coupled to the high speed bus 360.

The display 338 may include, for example, an interactive LED/LCD module positioned in a suitable location such as within or attached to the broadband residential gateway 300. The display 338 may include an interface to notify, display and receive user inputs and processing status. The display 338 may be configured to display various informational status and data entry screens and screen portions in a hierarchical tree structure according to expected utilization during call set-up and processing. Status screens may be provided for multimedia mail, called party ID, call logs, call set-up, call in progress and associated information, call waiting information, call conferencing, and/or other call related information. The display 338 may provide a display of real time status of the various devices connected to the broadband residential gateway 300 as well as any current connections, calls, and/or data transfers. The display 338 may also include touch screen capabilities that allow information to be input via a plurality of interrelated on-screen prompts, on-screen icons, and/or a keypad (for example, an alphanumeric keyboard). The keypad may be a remote control, numeric keyboard, and/or alphanumeric keyboard.

In one embodiment of the display 338 operation, a user may touch an icon representing a pending voicemail and/or multimedia mail message. The panel may be configured to send an electronic signal to the processing controller 306 and/or an attached processor such as the telephony processor. On receiving the signal, the P1 telephony processor 308 may be configured to generate an IP packet via the transceiver 302 across portions of the broadband network 1 to the multimedia server 222 in IP central station 200. The multimedia server 222 may authenticate the request by, for example, verifying the caller with call manager 218 which at call-set-up verifies the location of the request and/or the identity of the requesting party, for example, via a user's SIM card or other secure identification means. Where identity of the calling party is being verified, the user may enter an access password by an audio and/or keyboard request in addition to presenting their SIM card. Where an audio request is generated, the user may utilize the external/internal intercom module 344 of the broadband residential gateway 300, or via a text message entered into the display 338. The user may then enter the appropriate access code via the onscreen soft keypad, microphone, and/or keyboard. Alternatively, the multimedia message could be stored locally in the broadband residential gateway 300 memory 322 and depending on whether there is a password lock on the broadband residential gateway 300, the user may not have to enter a password and swipe their SIM card to access the message. Where the message is stored locally in the broadband residential gateways 300 memory 322 rather than IP central station, the display 338 simply recalls the message from memory and presents to the user to provide one-touch instant message retrieval.

In embodiments where the broadband residential gateway 300 supports multiple mailboxes, the icons on the LCD/LED may be personalized to show the identity of the owner of the message. Each user may have a different password to ensure privacy of access. An activity log which tracks past and present messages and/or archived multimedia messages may be presented on display 338. The archive may be stored locally, or at a remote location such as IP central. The archive may be utilized by the user to recall messages which have long since been erased from local storage but may be retrieved from IP central on tape and/or disk storage. This is preferably an optional feature for those users who are less security conscious. The multimedia messages need not be displayed only on display 338. In alternate embodiments, any of the peripheral devices attached to the broadband residential gateway 300 are capable of receiving the multimedia messages.

The memory 322 may be variously configured to include one or more field-upgradeable card slots for permitting memory expansion. Certain users may wish to enable higher end applications such as near video on demand (for example, pausing of shows via buffering in memory), video conferencing of multiple users, multi-party conferences, call waiting for multiple parties, etc. Accordingly, the use of a broadband residential gateway 300 allows the user to upgrade memory via inserting additional cards. Alternatively, the user may use system memory in IP central and buffer data remotely.

Operating program store 330 may be configured to receive updates. This may be accomplished by having the user replace one or more memory cards or automatically by the IP central station downloading new operating code into one or more residential gateways 300.

As previously indicated, smart buffer logic (SBL) may be coupled to the telephony port(s) 332, data port(s) 334, TV port(s) 336, peripheral port(s) 342, and/or the distributed processing controller (DPC) 306. Where the smart buffer logic is utilized, it may function to buffer IP packets for delivery over the communication network such as the hybrid fiber-coaxial plant 112. In addition, the smart buffer logic may include selectable switching and routing algorithms based on services and applications associated with each port. Depending on the destination of the IP traffic, the smart buffer logic may multiplex signal from various devices to effect faster information transfer. The smart buffer logic may also allow direct memory access between memory 322 and one or more of the devices and/or ports coupled to the high speed bus 360.

The telephony port(s) 332 may include various interface circuitry (for example, analog interface, logic and firmware for interfacing with the Plain Old Telephone (POTs) telephones). Also the telephony port(s) 332 may also be configured to include user interface logic, voice processing logic, voice activity detector logic, voice CODECs, and DTMF (dual tone multi-frequency) tone sensing logic. Echo cancellation and automatic gain control may also be utilized in the telephony port(s) 332 circuitry. In one embodiment, RJ-111 connectors for a plurality of lines (for example, 4) are provided for connection to one or more existing plain old telephone system 110 telephone units. However, the broadband residential gateway 300 may contain any number of telephone connection ports. In this manner, any number of existing user terminals may be connected directly to the broadband residential gateway 300 without modification. Alternatively, the broadband residential gateway can be configured to support, in addition to or as alternative to the plain old telephone system telephone units, ISDN telephones and/or other digital phones (for example, IP telephones) using an appropriate interface.

The data port(s) 334 interface may be variously configured. In one configuration, the data ports include high speed data service connections to, for example, a personal computer (PC) using a LAN connection. For example, the data ports 334 may include an Ethernet 802.3 connection compatible with category 5 unshielded twisted pair (UTP) cable and a RJ-45 connector. The data port(s) 334 may include the necessary interface circuitry for coupling to remote computers.

The TV port(s) 336 may include an interface for conventional television, HDTV and/or CATV services. The TV port(s) 336 typically have one or more F-connectors used for coaxial cable connection to a TV set(s). The TV ports may be configured to connect to a set top box (STB) via the F-connector or directly to a remote television. In embodiments where the settop box is co-located with the television, the data supplied over the TV ports may be either analog and/or digital information. Where the settop box is integrated into and/or comprises the broadband residential gateway 300, the TV ports may be analog or compatible with HDTV signals.

The broadband residential gateway 300 need not necessarily be limited to home use and is intended to also be utilized in business applications. In some configurations, the broadband residential gateway 300 may serve the same functions and operate as a private branch exchange (PBX). Where greater capacity is desired, one or more broadband residential gateways 300 may be disposed on a PC card and combined in a PC, rackmount, and/or server to create an expandable private branch exchange type system that enables intra-premises calling between telephones connected to various telephone connectors on the broadband residential gateway 300.

C. Integrated Broadband IP Based Communication System

Figure 4:
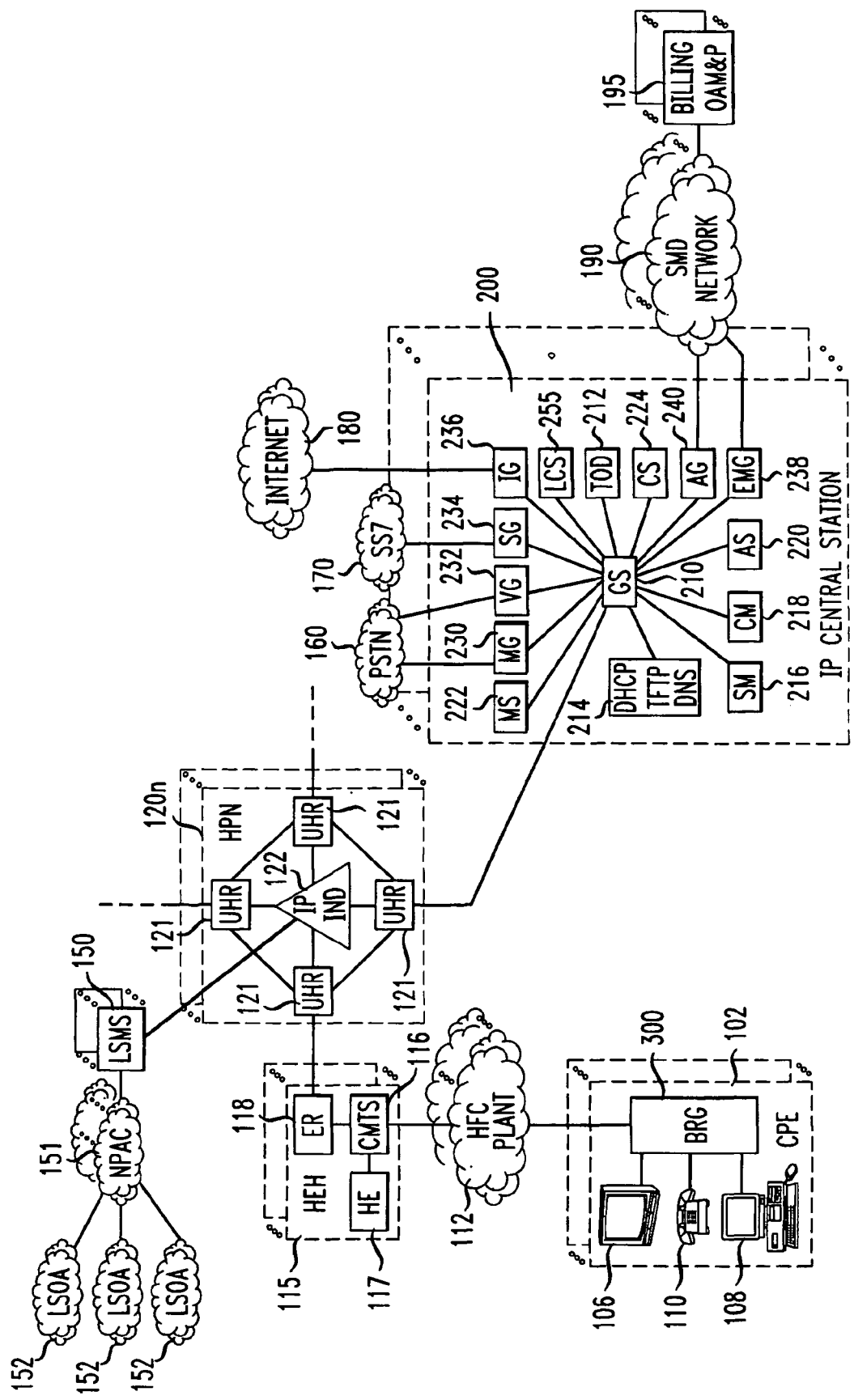
FIG. 4 shows a detailed schematic representation of an exemplary embodiment of the broadband network shown in FIG. 1.

FIG. 4 shows an exemplary embodiment of the broadband network 1 shown in FIGS. 1-3, with like components identified with identical numbers. At the extremities of the integrated communications system is the customer premises equipment unit (CPE) 102, for example, one or more customer premise equipment 102 at each customer location. The customer premise equipment 102 may be configured to include an integrated communication interface device such as the broadband residential gateway 300. Other customer premise equipment 102 devices such as one or more televisions (TV) 106, personal computers (PC) 108, and telephones 110, etc., may be connected to the broadband residential gateway 300 via various ports as discussed above. The customer premise equipment 102 could include multiple TVs 106, telephones 110, and PCs 108 connected to a single and/or multiple broadband residential gateway 300. Further, in certain embodiments, it may be desirable to divide the broadband residential gateway 300 into more than one physical package. In this manner, certain interface circuitry may be located outside of the home while various processing circuitry may be located near a peripheral device such as in a settop.

Where the broadband residential gateway 300 is coupled to the hybrid fiber-coaxial plant 112 in accordance with a preferred embodiment of the present invention, it may be configured to provide the user with both information data (for example, through an Ethernet interface), telephony access, and bidirectional TV service (for example, HDTV, Digital TV and/or CATV services). In exemplary embodiments, the hybrid fiber-coaxial plant 112 typically includes both coaxial cable and optical fiber networks, though, where desired, the network may include only coaxial cable or optical fiber. The hybrid fiber-coaxial plant 112 may be coupled to a head-end hub (HEH) 115. The head end hub 115 may provide an interconnection point to gather and/or transform external services (for example, off air and satellite video, public switched telephone network voice, and Internet data) into a format suitable for distribution on the hybrid fiber-coaxial plant 112 for use with the customer premise equipment 102. The head-end hub 115 may include one or more cable modem termination systems (CMTS) 116 coupled between the hybrid fiber-coaxial plant 112, a Head-end (HE) 117 and/or an Edge Router (ER) 118. The edge router 118 may be coupled to the cable modem termination system 116 and to one or more ultra high speed routers (UHR) 121. One or more ultra high speed routers 121 may be interconnected to each other and/or through a centralized mechanism such as an IP network database to form a high speed network. The high speed packet network 120n is one example of the network 120 (for example, IP network) shown in FIG. 1.

In the embodiment shown in FIG. 4, the high speed network 120n includes the ultra high-speed routers (UHR) 121 configured in a ring configuration. Although this embodiment shows the use of the IP network database (IND) 122, other configurations are also suitable. Where an IP network database 122 is utilized, it may be desirable to incorporate one or more data sets such as: a IP local number portability database (IP LNP) 122a which may be utilized for transferring local DN among service providers when a user changes their service provider; an IP caller/user name database (IP CNAME) 122b which may be utilized to provide a database of names relating to IP addresses and/or domain names; an IP line information database (IP LIDB) 122c which may provide alternative billing and allow flexibility in determining who pays for a call; and an IP 1-800 Database (IP 8YY) 122d which may provide a database of 1-800 numbers relating to the IP network 120a. Alternatively, the IP local number portability database may be located at another location, such as at an IP central station (IP Central) 130. Where desired, a local service management system (LSMS) 150 may be arranged to provide management of the IP local number portability database. Where a local service management system 150 is utilized, a plurality of local service order administration (LSOA) units 152 may be coupled to the local service management system by, for example, a number portability administration center (NPAC) 151. In this manner, directory numbers may be transported among different service providers. In such a case, a NPAC 151 is generally coupled to the LSMS 150 and uses the LSMS 150 to synchronize the numbering databases and to coordinate the porting process.

As indicated above, the broadband network 1 may include a plurality of interconnected high performance networks 120n. Each high performance network 120n may include a separate IP central station 200 and/or share a single IP central station. Having distributed IP central stations located throughout the broadband network 1 provides improved performance and quicker response time for an individual user. Although not illustrated, each high performance network 120, 120n may be connected to multiple head-end hubs 115, each head-end hub 115 may be connected to multiple hybrid fiber-coaxial plants 112, and each hybrid fiber-coaxial plant 112 may be connected to a plurality of customer premises equipment 102, each containing one or more broadband residential gateways 300. The plurality of high performance networks 120n may be configured as an interconnected network for routing packetized information from point-to-point in accordance with a desired destination.

The high performance network 120n may be configured to provide connectivity for and between a plurality of head-end hubs 115 and/or a plurality of broadband residential gateways 300 and other networks such as the Internet, for example, www 180, the public switched telephone network (PSTN) 160 and/or various signaling systems such as the SS7 network 170 for end-to-end voice over IP applications. The IP central station 200 may be configured to provide seamless integration and control of the high performance network 120 (for example, an IP based communication system) interface with the public switched telephone networks (PSTN) 160, signaling system seven (SS7) 170, and/or the Internet 180 so that packetized data, voice calls, and other signaling information is properly transferred between the broadband residential gateway 300 and the public switched telephone network 160 and Internet 180. In certain configurations, the hybrid fiber-coaxial 112, head-end hub 115, and high performance network 120, provide a signal conduit for packetized voice and data which may, with the coordination of the IP central station 200, be provided in the appropriate format between the broadband residential gateway 300, the public switched telephone network 160, and/or the www 180.

D. General Operation of Integrated Communication System

The typical home user is currently required to purchase multiple intelligent data conduits such as multiple set-top boxes, a plurality of conventional, DSL and/or ISDN phones, cable modems, HDTV receivers, satellite receivers, home PC LANs, etc. The integrated communication system of the present invention provides a user friendly versatile communication system that enables voice/data (including video) over IP telephony, information data (for example, PC and Internet), television and other high data rate services in a system with one intelligent customer premise equipment 102 interface, the broadband residential gateway 300. The broadband residential gateway 300 in conjunction with the IP central station 200 provides a flexible communication system that can provide any number of integrated communication service features and functions without requiring the user to become familiar with numerous, diverse types of equipment.

In one exemplary application of the voice over IP operations, the broadband residential gateway 300 digitizes the analog telephony signal using, for example, G.711 μlaw coding (64 Kbps Pulse Code Modulation). The digital samples may then be packetized in, for example, the broadband residential gateway 300 into IP packets. The broadband residential gateway 300 may be configured to encapsulate the IP packets into, for example, DOCSIS (Data Over Cable Service Interface Specifications) frames for transmission back to the head-end hub (HEH) 115 over the hybrid fiber-coaxial plant 112. The hybrid fiber-coaxial plant 112 may then be configured to transport signals for both upstream (to head-end hub 202) and downstream (to the broadband residential gateway 300 and customer premise equipment 102) directions. Although the DOCSIS protocol is utilized in this example, any future protocol may also be used for the digitizing and packeting of data. Where the protocol changes, it may be desirable to download new operating code from, for example, IP central station 200 to the individual broadband residential gateways 300, to update the communication protocols dynamically. When new protocols are adopted, the IP central station may utilize, for example, the system management server 216 to download new protocol data into, for example, the protocol manager in the call manager 218 and the program store 330 in the broadband residential gateway 300.

Where voice packets are sent over constant bit rate (CBR) channels using unsolicited grants, additional packet data channels may be used to support signaling messages (for example, SGCP, Simple Gateway Control Protocol), high-speed cable modem service and/or other upstream packet data services. The upstream packet data services may be sent using available bit rate (ABR) channels such that the voice channels not impacted by data traffic. All services provided herein should be considered together as variable bit rate services because, during a communication, a user may change their data rate requirements in real time in response to user input. For example, during call set-up and even during a communication, a user may specify or respecify their particular data rate requirements to accomplish a given communication segment.

1. TV Signal Reception

The head-end 117 may originate CATV signals for transmission over the distribution network. However, in alternate embodiments, signals may be inserted at other points in the distribution network, such as at various hubs or may arise at remote locations in the network such as IP central. Down stream channels may be utilized to facilitate the transmission of signals from the head-end or other input distribution point to the subscriber premise. Where analog RF signals arrive at the broadband residential gateway 300 of the customer premise equipment 102, typically, the transceiver circuitry 302 will detect if the signal is addressed to this broadband residential gateway 300. If so, the transceiver will allow reception of the RF signal. Upon conversion to a digital format, the signal is typically output over the high speed bus (HSB) 360 to one or more associated devices for processing. For example, where the signal is a TV signal, the signal may be output directly to the TV port 336 and/or processed by the settop box 350 prior to outputting to the TV ports 336 and/or display 338. Where user channel selection is preformed directly in the broadband residential gateway 300, channel selection may be preformed by remote control transceiver 365 using an external device such as a remote control. The remote control transceiver may receive a plurality of individually coded remote control commands from different receivers and process the signals for only one associated device in accordance with the received commands. Alternative channel inputs include the display 338 and/or any associated keypad. Authorization to certain channels may be controlled by security processor 340.

Where a remote settop box is utilized, the box may be coupled directly to the HFC for individual frequency tuning and/or receive a digital feed from the broadband residential gateway 300 after decoding the digital signal. For example, where hybrid fiber-coaxial plant 112 contains fiber connections to locations near the individual homes, it may be desirable to download one or more simultaneous individually requested programming stream(s) and/or digital data stream(s) to the broadband residential gateway 300. In this manner, the number of channels, movie selections, and/or entertainment options available to the user are unlimited. Cost is minimized since only a single intelligent user interface is used in the home and all televisions, phones, computers, and/or other user interface devices use the same intelligent user interface to the broadband network 1. In this manner, the broadband network 1 may offer premium television, voice and/or data services to multiple conventional televisions, phones, and PCs without the use of multiple set boxes, modems, and external connections. With a vision phone or a personal computer equipped with a microphone and camera connected to the BRG, video telephony and conferencing is possible. Thus, the users are provided a single unified interface to satisfy their external data needs.

2. Exemplary Call Flow of an On-Network Call to an Off-Network Call, with the Off-Network Call Initiating the Dropping.

Figure 5:
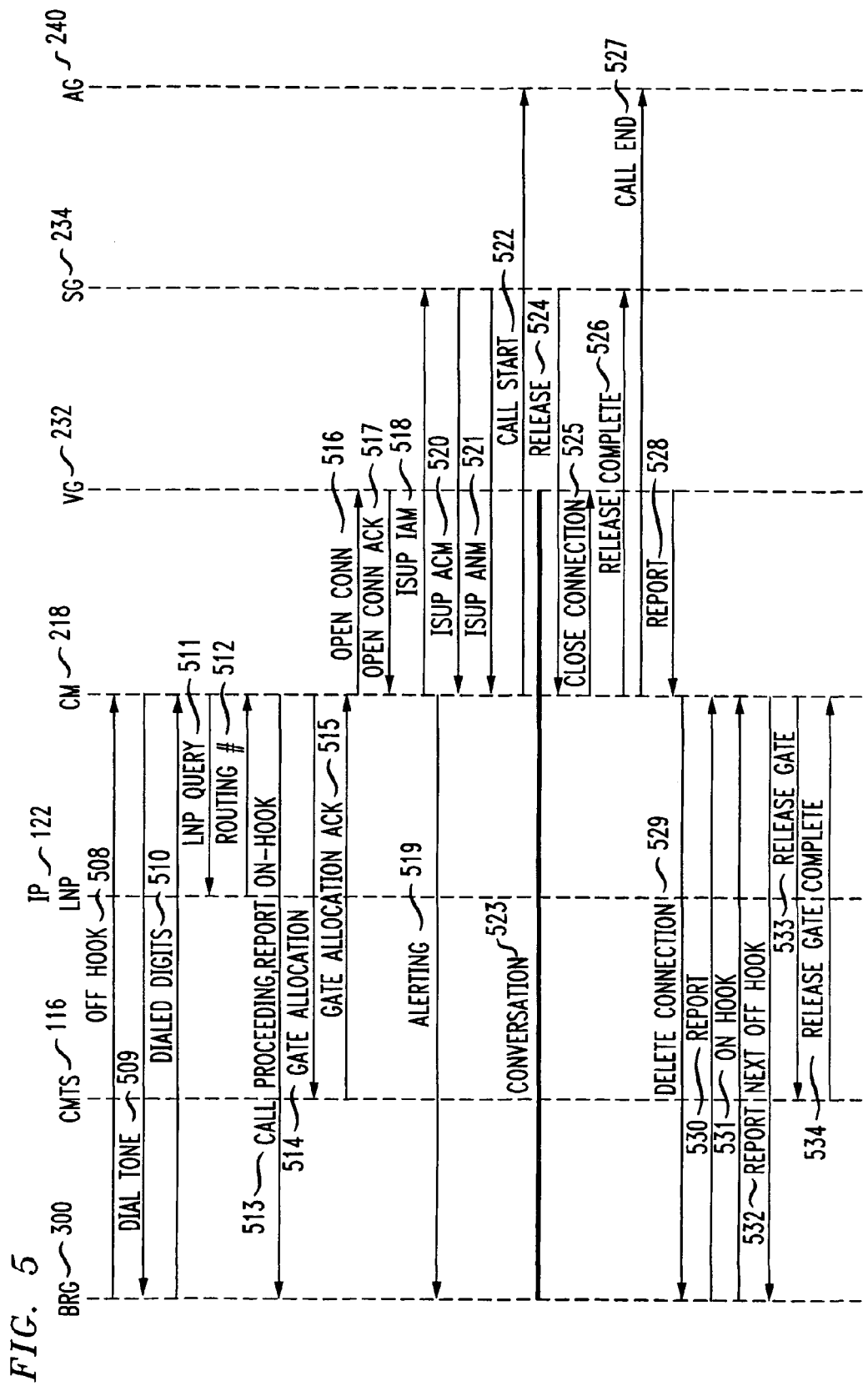
FIG. 5 is a signal flow diagram illustrating a typical on-network to off-network call according to one preferred method of operating the broadband network shown in FIG. 1.

FIG. 5 illustrates an exemplary call processing sequence for an on-net call (for example, an IP based call) to an off-net call (for example, a public switched telephone network based call), in which the off-net party initiates the drop call sequence. Of course, the reverse or alternate routing back and forth among alternative networks may be accomplished as well—IP to circuit-switched back to IP and so on. The exemplary call processing sequence operates as follows:

1. Once the broadband residential gateway 300 detects an off hook condition, the broadband residential gateway 300 may generate an off hook signal 508 to the call manager (CM) 218. The call manager 218 verifies the user's identity by looking for password and SIM card data or other security means, retrieves their user profile, for example, from the card memory (default qos and other data as well as their identity and preferences) and polls the BRG 300 for the terminal configuration identity that the user is connected through. At the same time, the BRG 300 may advise the call manager 218 of any user entered default or required communication parameters including data rate, quality of service, preferred service provider and the like from the card or a call set-up screen as will be further described herein. The call manager may compare the communication parameters with configuration data and provide an error message to the user if the user may not be able to accomplish a communication as requested. For example, the user may be advised to move to another available terminal connected to the BRG 300. The off hook signal acts as a dial tone request to the call manager 218. Alternatively, the broadband residential gateway 300 may collect all Internet address data or dialed digits (collectively, called party address data) before activating the off hook condition. This alternative may be desirable to save resources at the call manager 218 where multiple incoming lines are available to handle any additional calls. Thus, even though one phone is off-hook, the broadband residential gateway 300 determines that other lines are available and does not initiate the off-hook signal until all called party address data have been collected.

2. Where the call is managed by the call manager, the call manager 218 will issue a dial tone message 509 to the requesting broadband residential gateway 300 in order for the broadband residential gateway 300 to generate a dial tone to the associated phone. Where the broadband residential gateway 300 shares management of the call, the broadband residential gateway 300 generates the dial tone in response to the off-hook condition.

3. Where the call is managed by the call manager 218, the call manager 218 will then enter a state where it polls and collects the dialed digits 510 from the broadband residential gateway 300. The called party address data including Internet address or dialed digits may then be transferred to the call manager 218 one at a time as they are entered. Alternatively, where the call set-up control process is shared between the broadband residential gateway 300 and the call manager 218, the broadband residential gateway 300 collects the called party address data and transfers these, together with the off-hook signal to the call manager 218. This transfer may be facilitated by combining the called party address data with other data into a single or multiple data packets as necessary.

4. On receiving the called party address data, the call manager 218 will determine if translation of called party address data is required and, if so, perform the translation. For example, the call manager may determine whether local number portability has been enabled. Where local number portability has been enabled, the call manager 218 may issue a local number portability (LNP) query 511 to the IP local number portability database 122. The IP local number portability database 122 may then supply the call manager 218 with a routing number 512 if the called party address data form a valid sequence. Where the called party address data do not form a valid sequence, the call manager 218 will return an error indication to the broadband residential gateway 300. The error designation may include a tone and/or a more detailed error message for display on, for example, display 338.

5. Where the call sequence is valid, the call manager 218 may issue a first call proceeding message 513 to the broadband residential gateway 300 indicating that the number is valid and the call is proceeding (for example, a valid on-hook condition).

6. Next, the call manager 218 typically determines whether adequate network resources are available to carry the call by comparing the communication requirements (default requirements or specified requirements) to the network resources and determining least cost routing via least cost route server 255 and alternative network paths in priority order. These are displayed to the user as discussed further herein. The call manager also involves the multimedia server and conference server as necessary. The call manager 218 also polls a BRG associated with the called party to determine if their resources are adequate to complete the communication as requested by retrieving the called party's terminal configuration data. Error messages may be provide to the user if there exists a mismatch between call set-up requirements and called party terminal configuration. In embodiments where the broadband residential gateway 300 is connected to a hybrid fiber-coaxial plant 112, the call manager 218 may send an open gate allocation request 514 to the cable modem transmission system 116. In this event, it is often desirable for the cable modem transmission system 116 to provide a gate allocation acknowledgement 515. A gate allocation acknowledgement may be utilized to verify that the necessary gate and any alternative gate resources have been allocated.

7. The call manager 218 may send an open connection request 516 to the voice gateway (VG) 232 in order to provision the connection. Once the connection is provisioned, the VG 232 may provide an open connection acknowledgement 517 back to the call manager 218.

8. For off network connections, it is often necessary to enter a second phase of the connection process involving the appropriate link signaling to establish a call. For example, the call manager 218 may send an ISUP IAM (Initial Address) message 518 containing the directory number (DN) of the called party(s) to the signaling gateway (SG) 234 and conference server 224 as necessary. This process is often utilized to allocate the appropriate voice trunk for communication. The call manager 218 may also send an alerting message 519 to the broadband residential gateway to produce an alerting signal, for example, an audible ringing tone to the user terminal. The signaling gateway 234 may make the appropriate connections when the trunk has been allocated and acknowledge the request with an ISUP A call manager (Address Complete) message 520.

9. Once the called party has answered the call and connection is established, the signaling gateway 234 may send an ISUP ANM (Answered) message 521 to the call manager 218 indicating that the called party has answered.

10. The call manager 218 may then send a time/date-stamped call start message 522 to the accounting gateway (AG) 240, indicating the start of the call. The AG 240 may use this information for billing purposes.

11. At this point, the link has been established and a conversation 523 can proceed over the communications path. Note that although signaling system 7 (SS7) signaling is used herein to illustrate the present invention and is a well known signaling protocol utilized in the art of telephony telecommunication, the instant invention is not limited to the use of signaling system 7 (SS7) signaling for call establishment of an off-network call; the use of signaling system 7 (SS7) signaling is merely illustrative. As such, other methods of signaling may be substituted for signaling system 7 (SS7).

As will be discussed further herein, a user may change call parameters in real time by entering new requirements (data rate, quality of service and the like) during a communication. For example, the user may request a greater data rate to play a home video or sequence of digital images to the called party. Steps 1-11 then are repeated to assure the availability of network and called party resources. Any such change may involve a billing change and a date/time stamped call progress change message is sent to the accounting gateway 240 to document the change. Also, periodically during a call, the actual quality of service and data rate may be forwarded by the call manager 218 to the accounting gateway 240.

12. When the called public switched telephone network user terminates the link, an on hook signal may be sent to the appropriate public switched telephone network switch, such as a 5ESS. The signaling network may then send a call termination message (not shown) to the signaling gateway 234 as notification of the call termination status.

13. The signaling gateway 234 may then generate a release 524 signal to the call manager 218.

14. Upon receipt of the release 524 signal, the call manager 218 may a) initiate the relinquishment of the provisioned network resources by issuing a close connection 525 message to the voice gateway (VG) 232 and a release complete 526 message to the signaling gateway 234, b) inform the accounting gateway that the call has been terminated, for billing purposes via, for example, sending a time/date stamped call end 527 message to the accounting gateway 240.

15. With reference to the close connection 525 message, the voice gateway may respond by issuing a report message 528 to the call manager 218 containing the current status of the call.
16. On receiving the call status report 528, the call manager 218 may issue a delete connection 529 message to the broadband residential gateway 300.
17. The broadband residential gateway 300 may then release its resources and sends a status report 530 to the call manager 218. In addition to the report 530, the broadband residential gateway 300 may also send an on hook 531 status report to the call manager 218.
18. The call manager 218 may then inform the broadband residential gateway 300 to report the next off hook condition via message 532.
19. Where a cable modem transmission system is utilized, the call manager 218 may then issue a release gate 533 message to the cable modem transmission system 116 so that all the modem resources can be relinquished. Once the gate resources have been released, the cable modem transmission system 118 sends a release gate complete 534 message to the call manager 218. At this point, all resources pertaining to the call have been relinquished.

Communications may involve call set-up parameters or call change parameters involving a user selected higher data rate and quality of service as discussed above. It is also contemplated by the present invention to change a preferred long distance carrier in real time in response to user inputs. The call manager 218 may initiate a change in preferred service provider via the accounting gateway 240 which organizes ad controls a negotiation between preferred service providers in real time. The service providers, for example, may share their subscriber billing data and collect the electronic signature of the user who authorized the change. For example, AT&T may negotiate a change to MCI during a call and a subscriber may receive bills for the same call whereby a first call segment is billed by one service provider and a second call segment is billed by the other newer preferred service provider.

Figure 6:
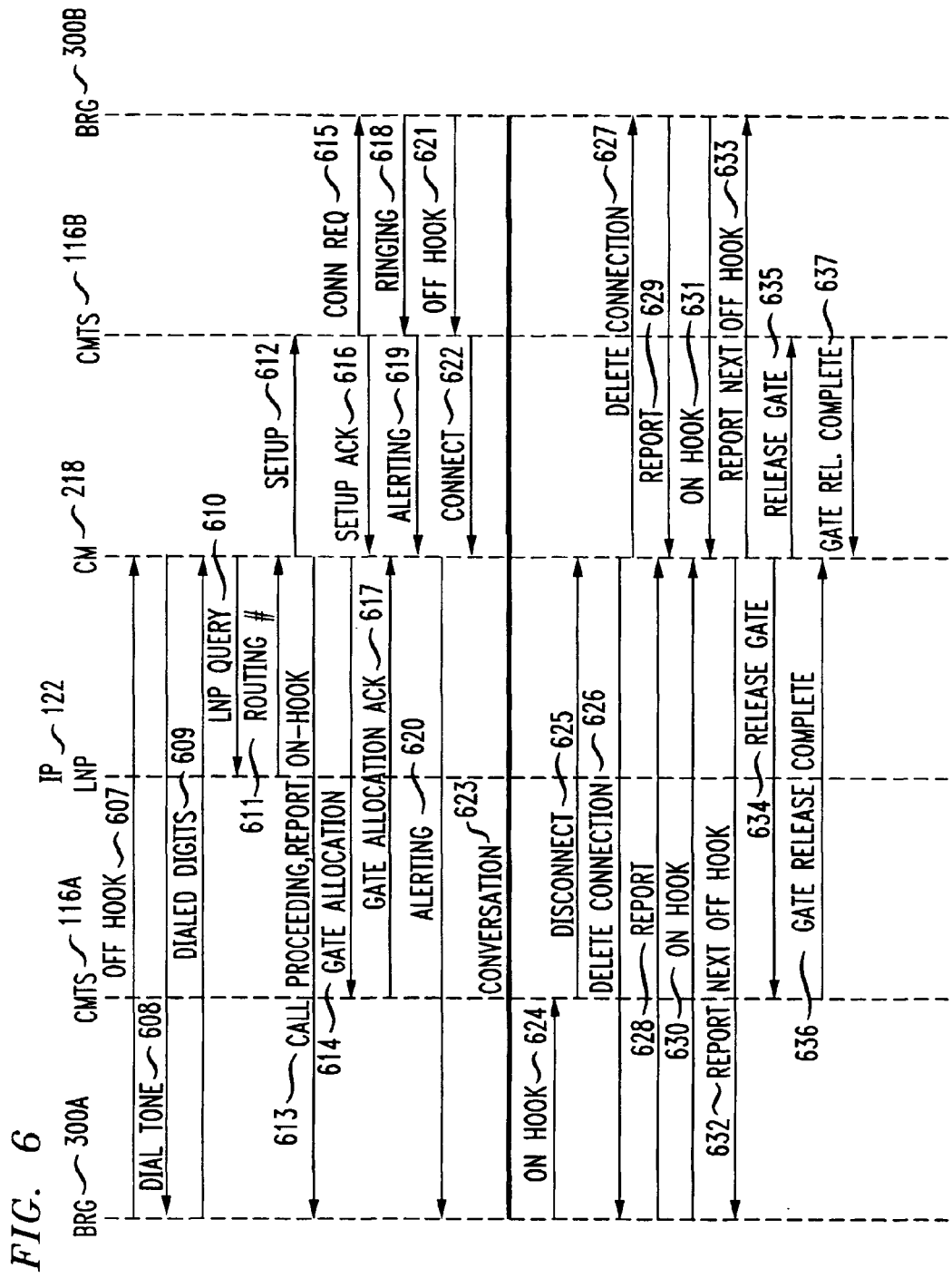
FIG. 6 is a signal flow diagram illustrating a typical on-network to on-network call according to one preferred method of operating the broadband network shown in FIG. 1.

3. Exemplary Call Flow of an On-Network Call to Another On-Network User, Under One Call Manager Control FIG. 6 illustrates an exemplary call flow of an on-network call to another on-network user, with the call being handled by a single call manager (CM) 218. In alternate embodiments, different portions of the call set-up sequence may be handled by more than one call manager 218 in the IP network 120. The exemplary "on-network" call processing sequence operates as follows:

1. Once the broadband residential gateway 300A detects an off hook condition of, for example, a user terminal, the broadband residential gateway 300A may generate an off hook signal 607 to the call manager (CM) 218. The off hook signal may act as a dial tone request to the call manager 218. As above, the call manager verifies subscriber/user identity and collects call set-up and terminal configuration data.
2. The call manager 218 may then issue a dial tone message 608 to the requesting near-side broadband residential gateway 300A in order for the broadband residential gateway 300A to generate a dial tone.
3. The call manager 218 may then enter a state where it polls and collects the called party address data including Internet address or dialed digits 609 from broadband residential gateway 300A. The dialed digits are transferred to the call manager 218 one at a time. In a similar fashion to the subject matter discussed above, in embodiments where the call setup is shared between the call manager 218 and the broadband residential gateway 300A, the broadband residential gateway may manage the call set-up and transfer both the off-hook signal and the dialed digits to the call manager 218 within one or more data packets.
4. On receiving the completed dialed digits, the call manager 218 may perform necessary translation as described above, for example, by issuing a local number portability query 610 to the IP local number portability database 122. The IP local number portability database 122 may then supply the call manager 218 with a routing number 611 if the dialed digits constitute a valid sequence.
5. The call manager 218 may then ensure that adequate network resources and calling party and called party's terminal configuration are available and appropriate to accommodate the call.
6. Where adequate resources are available, the call manager 218 may issue a first setup message 612 to whatever mechanism couples the far side broadband residential gateway 300, for example, the cable modem transmission system 116B, to allocate transmission resources on the far side.
7. A call proceeding message and a report on hook condition message 613 may then be sent to the broadband residential gateway 300A.
8. A gate allocation message 614 may then be sent from the call manager 218 to the cable modem transmission system 116A, where the broadband residential gateway 300A is coupled via a cable modem transmission system. In this environment, a gate allocation 614 message may be utilized to set up the relevant modem resources.
9. Where a cable modem transmission system is utilized and receives the setup message 612 from call manager 218, the cable modem transmission system 116B may then send a connection request 615 message to the far side broadband residential gateway 300B.
10. Where a cable modem transmission system 116B is utilized, the cable modem transmission system may then sends a setup acknowledgement 616 to call manager 218. Once the resources are allocated by the cable modem transmission system 116A, the cable modem transmission system may then send a gate allocation acknowledgement message 617 back to the call manager 218.
11. Once the call manager 218 receives the setup acknowledgement 616 along with the gate allocation acknowledgement message 617, the far-side broadband residential gateway 300B may then send a ringing message 618 to the far-side cable modem transmission system 116B where this connectivity is utilized.
12. In these embodiments, the far-side cable modem transmission system 116B may then issue an alerting message 619 to the call manager 218.
13. The call manager 218 may then convey the alert via an alerting message 620 to the broadband residential gateway 300A, to produce a indicating signal sich as a ringing signal indicating that the call is going through.

14. The cable modem transmission system 116B may then issue a connect message 622 to the call manager 218 in response to the far-side broadband residential gateway 300B sending an off hook message 621 to the far-side cable modem transmission system 116B. At this point, an end-to-end communication path is established and conversation 623 can be facilitated. QoS and data rate monitoring begins and are reported to a user via their display as will be described further herein via call manager 218.

15. Assuming that the calling party hangs up first, the broadband residential gateway 300A may initiate an on hook sequence 624 message which may be communicated to the near-side cable modem transmission system 116A.

16. The cable modem transmission system 116A may then issue a disconnect message 625 to the call manager (CM) 218. The call manager 218 may then issue a first delete connection request 626 to the near-side broadband residential gateway 300A and then a second delete connection request 627 to the far-side broadband residential gateway 300B.

17. The near-side broadband residential gateway 300A may respond to the call manager 218 with a report message 628 containing the connection status, as well as an on hook message 630 to verify that the calling party at near-side broadband residential gateway 300A has terminated the call.

18. The far-side broadband residential gateway 300B may respond to the call manager 218 with a report message 629 containing the connection status, as well as an on hook message 631 indicating that the called party connection has now been terminated.

19. At this point, the call manager 218 may issue release gate messages 634 and 635 to the near-side cable modem transmission system 218 and far side cable modem transmission system 116B, respectively, so as to release the modems associated with the call. Once all the resources have releases, the cable modem transmission system 116A and the cable modem transmission system 116B may issue gate release complete messages 636 and 637 respectively to the call manager 218.

20. For simplicity, the accounting processing is not shown. However, the process used in FIG. 5 may be utilized as a billing procedure for on-net calls. Such a process might constitute sending a time/date-stamped call start message from the call manager 218 to an accounting gateway (AG) 240 after the connect message 622 is sent from the far-side cable modem transmission system 116B to call manager 218. The call start message, containing initial data rate, preferred service provider and quality of service data, would trigger the start of the billing procedure. Call change messages, as described above, may be initiated by the calling party. Assuming no changes as discussed above, a corresponding date/time stamped call end message providing ending data rate and quality of service data may then be sent from the call manager 218 to the AG 240 after the near-side cable modem transmission system 116A sends a disconnect message 625 to the call manager 218. This call end message may trigger the ending of the billing procedure for that call.

Although the IP voice packets for these calls are typically routed over the IP network 120, the system may, where appropriate, route IP voice packets over the Internet 180.

II. Billing IP Broadband Subscribers

Now a method of billing IP broadband subscribers and of locating a least cost route for a communication will be described in some detail with reference to FIGS. 7-11. FIG. 7 is a collection of screen portions which may comprise screens displayed on displays to users of the present invention such as call set up screens, call progress screens and alternative call routing screens. U.S. Pat. No. 6,363,150 issued Mar. 26, 2002 under the title "Billing method for customers having IP telephony service with multiple levels of security" by V. J. Bhagavath discloses a method of billing for multiple levels of security and its principles may be combined with the principles of the present invention for providing billing for multiple levels of quality of service and bit rates.

Figure 7A:
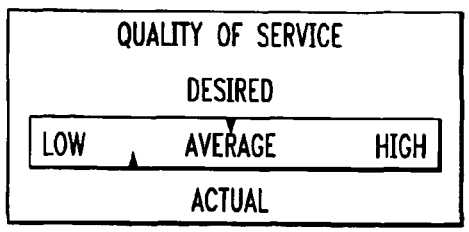
FIG. 7(a) is a representative screen portion whereby a user may select and/or the screen portion may display a quality of service.

FIG. 7(a) is a representative screen portion whereby a user may select and/or the screen portion may display a quality of service. In the depicted embodiment, a user is provide with actual and desired quality of service via a horizontal bar 701 including labels, low, average and high. The user may user their mouse to move the desired quality of service from the indicated average quality of service to a point closer to high or to low. Meanwhile, the actual quality of service delivered via the call manager 218 may lag such changes. Nevertheless, the user is able to set up a default quality of service in BRG memory, and also, for example, for storage on their SIM card, which would immediately appear on a call set-up screen as a starting point, or change their quality of service in real time during a communication. Default security levels, keys and encryption algorithms may also be contained in SIM card memory. The change in quality of service may be reflected in a higher or lower cost for a communication given other parameters remaining the same where a higher quality of service may be reflected in a higher cost per unit time as will be reflected in the bar screen portion 914 of FIG. 9(b). Vice versa, if the user voluntarily selects a higher cost via portion 914, the data rate being the same, the call manager 218 will interpret the request as a request for a higher quality of service and will adjust the bar 701 accordingly. The user/subscriber is billed for a plurality of communication segments dependent on actual quality of service, not desired, and typically will be able to receive a selected default quality of service with respect to any call the user makes according to their personal user profile selection. The default data may be stored on the SIM module that the subscriber carries with them from terminal configuration to terminal configuration. Parties who have joined a call in progress may be billed for their communication segments or the segment may be billed to the original calling or called party depending on call set-up or change parameters.

Figure 7B:
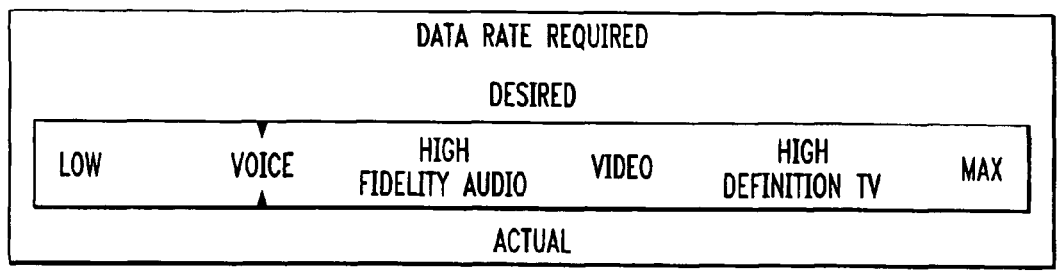
FIG. 7(b) is a representative screen portion whereby a user may select and/or the screen portion may display a data rate.

FIG. 7(b) is a representative screen portion whereby a user may select and/or the screen portion may display a data rate. A low data rate may represent an empty residence or closed business or government site. A low data rate is still necessary for such purposes as alarm reporting, energy management and the like services that may be provided at all times. The highest data rate is assumed to represent a data rate higher than that necessary to deliver a compressed high definition television signal. In multi-party conferencing of a video conference, a screen is preferably divided so that each participant may see all others in the call; yet no greater data rate than that required for a single HDTV signal would be required. As in FIG. 7(a), the user may receive a display of actual data rate delivered and desired data rate selected for a given segment. Typically, the default data rate will be one assumed for a voice call unless the user specifies higher or lower. High fidelity audio permits a user to receive high quality, compressed digital sound. Video refers to relatively average quality, compressed digital video, for example, for video conferencing or watching a movie at normal resolution.

Figure 7C:
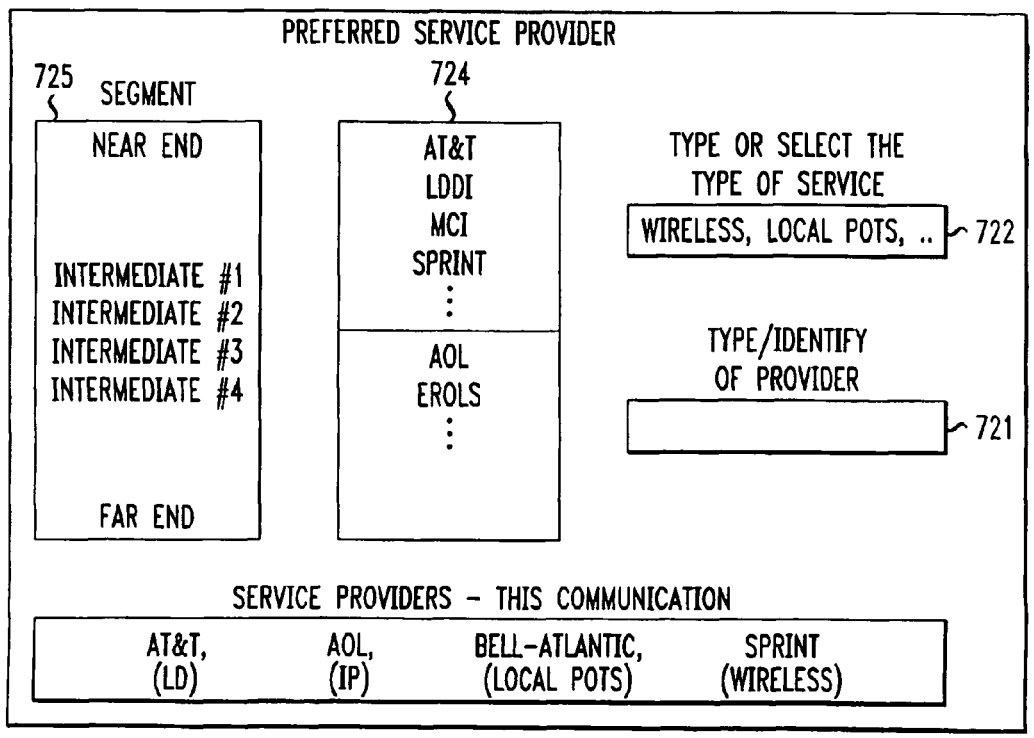
FIG. 7(c) is a representative screen portion whereby a user may select and/or the screen portion may display a preferred service provider for a segment of a communication.

FIG. 7(c) is a representative screen portion whereby a user may select and/or the screen portion may display a preferred service provider for a segment of a communication. As discussed above, and in accordance with the prior art in the United States, a subscriber may have only one preferred long distance provider. Although the user may subscribe to multiple Internet service providers, typically a user has only one subscription. A called party may also have a preferred service provider and choose to pay for their segment(s) of the call. The present invention anticipates the opportunity to change service providers in real time in response to user inputs. Initially, a user enters their service provider identities. The user classifies the service provider as wireless, long distance, Internet or the like via bar 722. One process for identifying a service provider to a type involves providing a number of service providers in a vertical bar. As the user types A, after selecting long distance at bar 722, then AT&T may appear in an alphabetical list of long distance carriers. Or after typing A and selecting Internet, the user might automatically see AOL appear on the display. The user may specify a segment of a call in segment vertical bar 725. For example, the user may specify that the called party is to be reached first via bar 722 of wireless phone at a far end segment 725. Typically, the first near end segment will be via the internet from a calling party. The calling party and called parties may negotiate over who pays for intermediate segments but the default choice will be the calling party.

"Int" represent intermediate segments of the call which may be one of Internet, ATM, POTS or other network known in the art. Bar 726 may represent an indication of the service providers being utilized in this communication, for example, AT&T to AOL to Bell Atlantic to Sprint and their type: long distance, ISP, local POTS, wireless.

Figure 8:
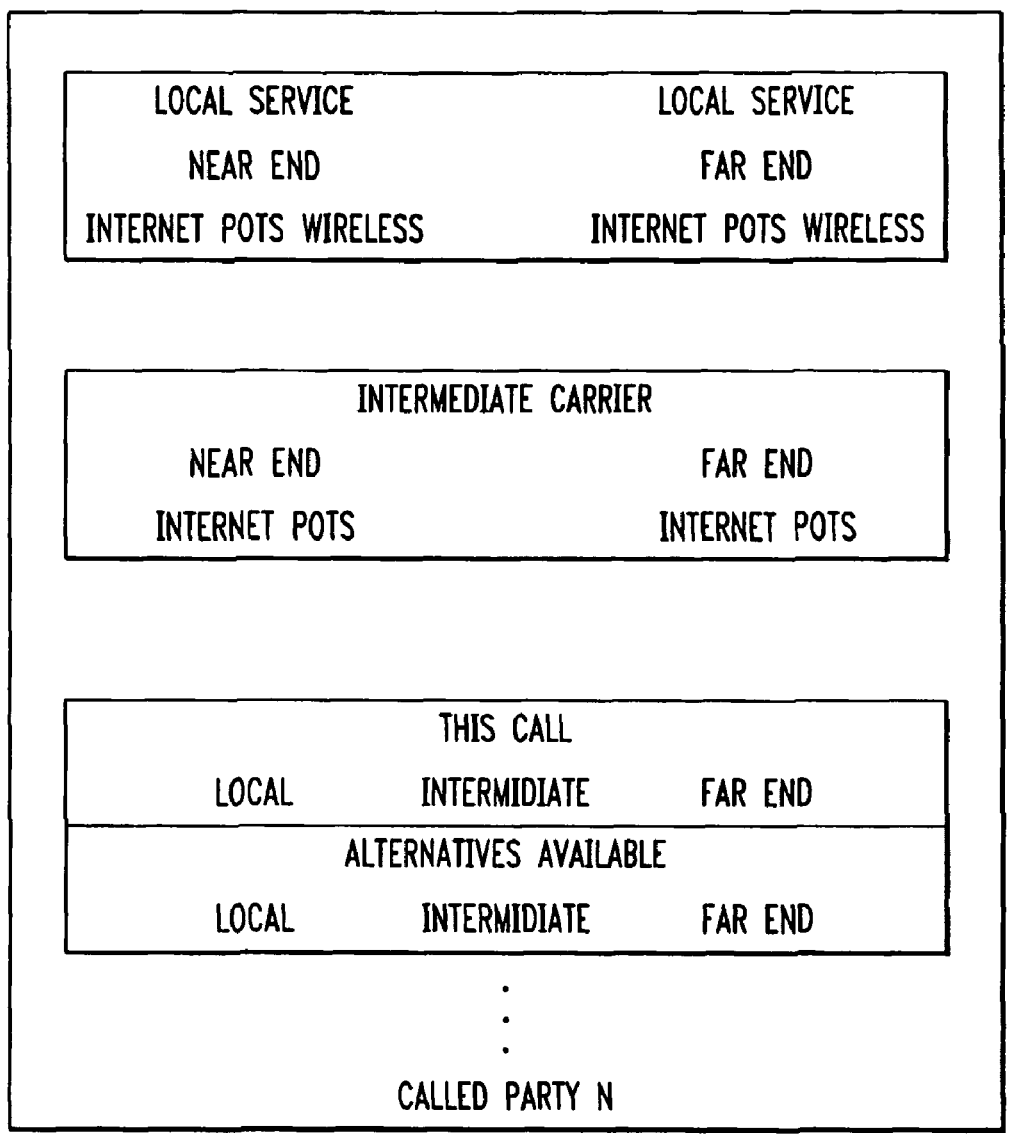
FIG. 8 is one embodiment of a screen or a screen portion for displaying actual and alternative routes for a given communication to a first called party; for a second or more called party(s), for example, in a conference call, there may be associated screens and/or screen portions for the other called parties.

FIG. 8 is one embodiment of a screen or a screen portion for displaying actual and alternative routes for a given communication to a first called party; for a second or more called party(s), for example, in a conference call, there may be associated screens and/or screen portions for the other called parties. There are depicted three segments of a call—Near End, Intermediate Carrier and Far End. The user may select for Near End or Far End among ISP, Pots or Wireless (among others not shown). Similarly, Far End service providers may be selected. For Intermediate carriers, several opportunities may be provided from a near end to a far end, for example, between Internet and Pots (or others including ATM not shown).

At the bottom of FIG. 8 is a screen portion for displaying This Call and Alternatives Available for this call during a communication. If a user selects a particular alternative by clicking on one of a list in the Alternatives Available list, then routing via that alternative is immediately arranged by the call manager prior to dropping the "This Call" routing. A new routing may impact quality of service and cost as described above and require the negotiation of a new preferred long distance service provider as necessary.

Figure 9A:
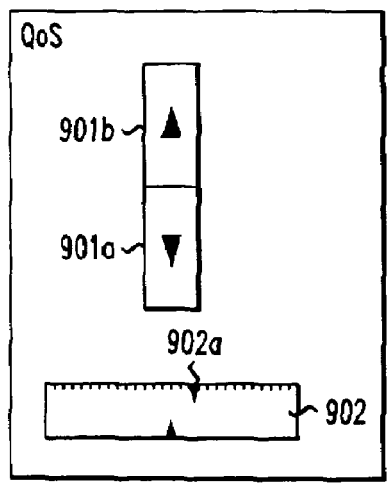
FIG. 9(a) is a representative screen portion for entry and display of desired and actual quality of service.

FIG. 9 is a collection of screen portions which may comprise screens for call progress data display and data entry. FIG. 9(a) is a representative screen portion for entry and display of desired and actual quality of service. There is a clickable up/down portion whereby clicking on 901b improves desired quality of service and clicking on 901a decreases quality of service. The actual and desired quality of service are displayed in display 902. The user may click and drag the desired arrow 902a.

Figure 9B:
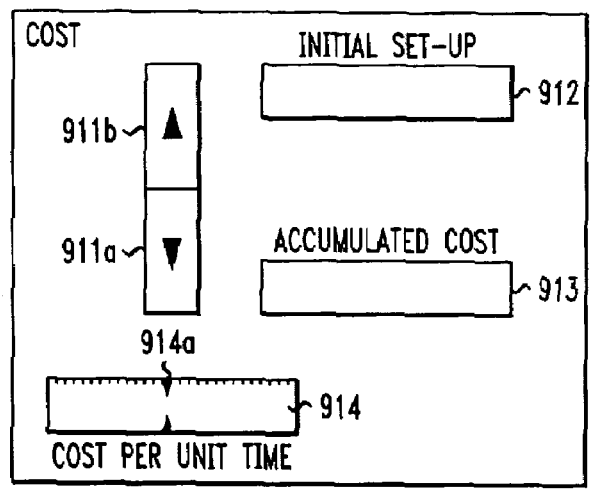
FIG. 9(b) is a representative screen portion for entry and display of desired and actual cost including communication set-up cost, accumulated cost and present cost per unit time.

FIG. 9(b) is a representative screen portion for entry and display of desired and actual cost including communication set-up cost 912, accumulated cost 913 and present cost per unit time 914. As before the user may click and drag arrow 914a which may impact QoS bar 902. The cost of the accumulated cost of the call represents the initial set-up cost for the segement(s) and the cost per unit time for delivered quality of service and data rate via the selected carriers.

Figure 9C:
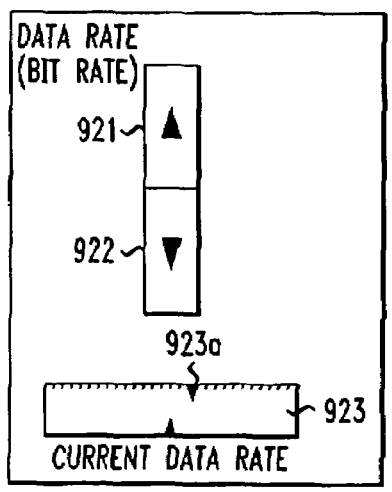
FIG. 9(c) is a representative screen portion for entry and display of required and actual data rate (bit rate).

FIG. 9(c) is a representative screen portion for entry and display of required and actual data rate (bit rate). Arrow 921 increases required bit rate and the desired arrow 923a moves accordingly, Arrow 922 lowers required bit rate. The user may click and drag arrow 923a as well.

Figures 10, 11A, 11B:
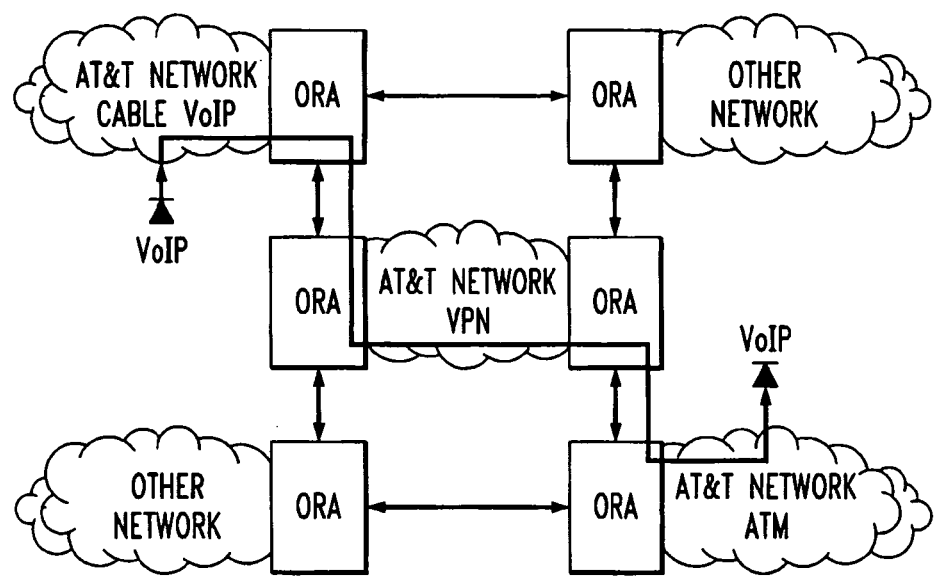
FIG. 10 is an example of one embodiment of one call set-up screen whereby a call manager may report to a broadband gateway at a user location on the characteristics of a called party configuration including their location, terminal resources and network resources.

FIG. 10 is an example of one embodiment of a screen portion of one call set-up screen whereby a call manager may report to a broadband gateway at a user location on the characteristics of a called party configuration including their location, terminal resources and network resources. As described above, the call manager preferably compares terminal configuration data for a calling party user and for a called party user with a desired call set-up parameter set entered by the user to determine if the communication can occur as desired and provides an error message if there exists a mismatch.

FIG. 11 is an example of an application of an optimized communication routing algorithm for use in providing real-time routing and re-routing during a communication in accordance with changing data rate or quality of service requirements for different called parties. FIG. 11b is a table for acronyms used in the other figures and the following discussion of an optimized routing algorithm. In particular, FIG. 11b defines Dialing Number (DN); Telephone Number (TN); Network Provider (NP); Originating Network Provider Identifier (ONP(ID)); Next Network Provider Identifier, one of the intermediate networks, (NNP(ID)); and Destination Network Provider Identifier (DNP(ID)).

Delivery of voice/data over IP packets from one location to a distant location worldwide requires transport service to carry the voice/data packets over different networks owned by different service providers. Segments of the call may be circuit-based and involve a different carrier and tariffs. Since using other service providers' networks at times results in a per use charge which increases the originating service provider's cost, there is a need for the originating service provider (for example, AT&T) to route a voice/data packet over a path which may provide the greatest profit for the originating service provider. Optimizing for greatest profit typically also provides a least cost route. In general, the most profitable route is the signal path that uses as much of the originating service provider's owned or leased networks as possible.

In accordance with the present invention, the originating service provider may also provide a high quality of telephone service based on customer requirements regardless of profit. One may also optimize based on data bit rate. The present optimized routing algorithm takes into consideration profit, cost, quality of service and bit rate and selects routes accordingly to display a least cost route and alternative routes at increasing cost.

Optimized Routing Algorithm (ORAs) software generates optimized signal routing of voice/data packets which are required to travel long distances around the world reaching a national or even an international destination. The ORA provides a solution for today's voice/data over IP (VoIP) applications that require transport of VoIP/Data packets through multiple networks which are often owned by different service providers and have different service quality levels. If a given service provider cannot be avoided, that service provider's low quality of service may set the maximum standard of quality of service such that any other service provider should not further degrade the quality. Every effort is made by the algorithm to meet the quality of service level provided by that service provider if quality of service, and not cost, become the user's driving parameter to the algorithm. The ORA can be programmed to optimize a number of cost or quality factors such as reducing non-originating service provider access/toll charges, reducing delay time in voice/data packet processing, or providing low signal to noise ratio for improved signal clarity.

As one example, the ORA allows VoIP/Data packets transmitted through optimized networks to reduce settlement charges with plural service providers which thereby increases the originating service provider's revenue, or to provide a particular quality of service level. The least cost routing server controlled by the call manager negotiates with distributed ORA's. The ORA associated with a network server for each network service provider can define homogeneous network(s) routing, (IP-IP), or heterogeneous networks (for example, IP-ATM-Frame Relay-IP; IP-PSTN-IP; IP-ATM-FR-PSTN-IP) routing as required. The optimized routing algorithm can be implemented in the Broadband Gateway 300, Router 200, least cost server 255, Internet gateway 236 and/or VoIP/Data controller 306. The ORA can transport VoIP/Data packets through multiple networks within one company (network provider) or many companies (multiple network providers) while achieving minimum settlement charges and maximizing the originating service providers (for example, AT&T) profit on the communication.

Alternatively, the ORA could be programmed to provide the most resource (for example, time, data rate, cost, etc.) efficient route so that the voice/data packet reaches its final destination the fastest and/or at an acceptable signal-to-noise ratio level. In the case of voice packets, the quickest route will provide a higher quality of service for voice calls on data services.

Figure 11C:
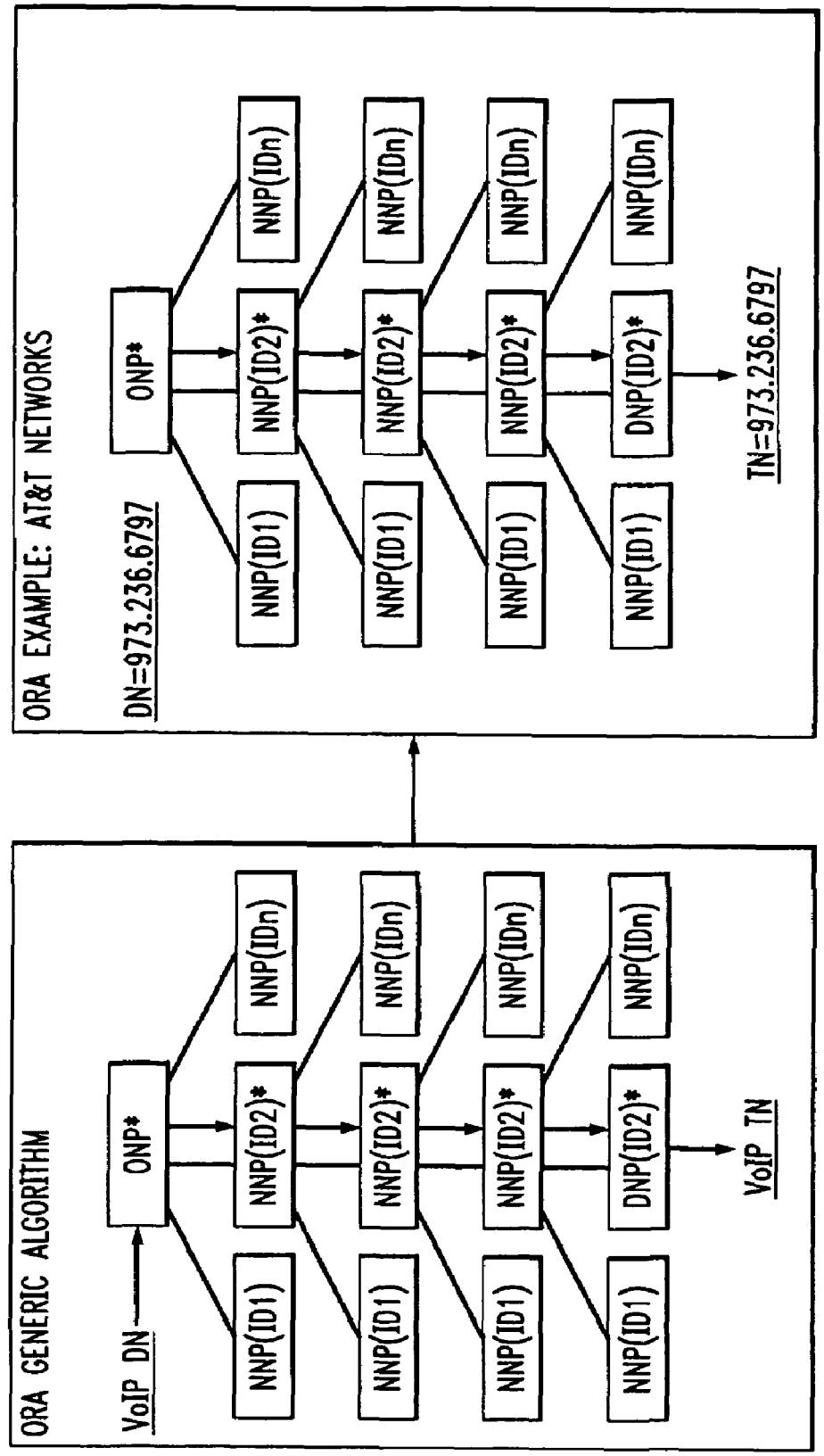
FIG. 11 is an example of an application of an optimized communication routing algorithm for use in providing real-time routing and re-routing during a communication in accordance with changing data rate or quality of service requirements for different called parties.

In operation, per FIGS. 11a and 11c as an example and AT&T as the near end service provider, the Broadband Gateway (BG) 300 may signal the Internet Gateway 236 via the least cost server 255 to use the ORA input to look at all possible information flow paths, for example, to transmit a voice/data packet from New Jersey to Japan and determine what is the best route to use so that the charges from non-AT&T service providers is minimized. A Voice over IP Directory Number VoIPDN originates a call via Originating Network Provider (ONP). The IG 236 then instructs the call manager CM 218 to route the voice/data packets according to the low cost route and indicates to the CM 218 whether the voice/data packets will travel on different types of networks (e.g., IP network, ATM Network, etc.). The IG 236 and ORA may also have secondary priorities (e.g., timelines) and tertiary priorities (signal-to-noise ratio, quality of service, delay, etc.) or other requirements that are factored into determining the optimum route for voice/data packets.

The ORA in the ONP communicates with a network server for the Next or NNP's ORA and decides to use NNP(ID2) as preferred over NNP(ID1) or NNP(IDn) as the next transporting network. The packets are then routed to NNP(ID2) which can be a gateway router or a digital switch. The, NNP(ID2) must communicate with the next network's ORA which likewise has a choice of NNP(ID1) or NNP(IDn) and so on in sequence. The Network Provider selected by the ORA keeps checking in sequence with the next network's ORA until finally a Destination Network Provider is reader having identifier (DNP(ID)). Depending on the protocols linking the selected network providers, the packets will be delivered at the DNP according to its data format and policy and modified, only as necessary, according to any changes required by the intermediate Network Providers, recognizing that changes may involve degradation in Quality of Service.

In an AT&T example depicted to the right of FIG. 11c, AT&T may be the originating provider and the number dialed 973.236.6797 where the ONP is AT&T cable and AT&T is capable of utilizing AT&T facilities through an ATM core network back to a cable company delivery of a communication within area code 973.

The above example assumes that the Internet (accessed via cable modem) is the near end initial or originating network service provider. The multimedia gateway 230, the voice gateway 232 are alternative gateways having ORA's as required for a given communication. If a circuit-switched network is desired to provide the highest quality of service for a voice call (for example, if the Internet Quality of Service is inadequate) then the ORA for the voice gateway 232 negotiates with other network gateways in sequence to provide the user's required quality of service and determine via least cost server 255, the alternate routes for that quality of service.

The invention claimed is:

1. A method of providing to a subscriber a least cost for a variable bit rate communication between a first terminal and a distant terminal to said subscriber, the method comprising
   i) determining least cost alternative network resources available for achieving said communication at a default quality of service and a required bit rate;
   ii) determining cost data associated with said network resources; and
   iii) outputting to said subscriber a least cost for said communication according to said default quality of service and said least cost alternative network resources.

2. The method of claim 1 further comprising coupling said first terminal and said distant terminal via said least cost determined network resources and said default quality of service at said required bit rate.

3. The method of claim 2 further comprising billing for said communication at said default quality of service and according to said required bit rate after the termination of the communication.

4. The method of claim 1 further comprising
   displaying a least cost route through a plurality of different networks, alternative network paths having a different quality of service, alternative selectable required bit rates and alternative costs;
   receiving a subscriber request for one of a different quality of service, a different required bit rate and a different alternative network path; and
   repeating steps i) through iii) in accordance with said subscriber request.

5. The method of claim 4 wherein said subscriber request comprises a request for a different required bit rate during said communication.

6. The method of claim 4 wherein said subscriber request comprises a request for a different quality of service.

7. The method of claim 4 wherein said subscriber request comprises a request for a different network path.

8. The method of claim 1 wherein said first terminal comprises means for capturing a visual image and said communication comprises an audio communication simultaneous with a visual communication.

9. The method of claim 8, wherein said first terminal further comprises a display and a subscriber input and said method further comprises the steps of
- displaying a least cost route through a plurality of networks alternative network paths having a different quality of service, alternative selectable required bit rates and alternative costs;
- receiving a subscriber request for one of a different quality of service, different required bit rate and a different network path; and
- repeating steps i) through iii) in accordance with the subscriber request.

10. The method of claim 9 wherein said subscriber request comprises a request for a different required bit rate during said communication.

11. The method of claim 9 wherein said subscriber request comprises a request for a different quality of service during said communication.

12. The method of claim 9 wherein said subscriber request comprises a request for a different network path.

13. The method of claim 12 wherein said different network path comprises a selection of a heterogeneous network of two or more different ones of internet protocol networks, the public switched telephone network, asynchronous transfer mode networks and frame relay networks.

14. Apparatus for billing a communication among a circuit-switched network and a packet switched network comprising:
- a first network server for one of said circuit-switched network or said packet switched network for forwarding data receiving from a broadband residential gateway to a central call station; receiving alternative route data consistent with a default quality of service data and user-required bit rate from a second network server for the other of said circuit-switched network or said packet-switched network; routing said communication according to said alternate route; receiving one of different quality of service and required bit rate data input by a user during said communication; rerouting said communication in real time in response to said user input during said communication and communication with an accounting gateway for billing said communication.

15. The apparatus of claim 14 wherein said first network server comprises a least cost server having a processor for operating an optimized routing algorithm, said least cost server coupled to a router and an internet gateway.

16. The apparatus of claim 14 wherein said first network server comprises an internet gateway having a processor for operating an optimized routing algorithm and said second network server comprises a gateway to a circuit switched network.

* * * * *